(12) United States Patent
Joo et al.

(10) Patent No.: US 11,383,252 B2
(45) Date of Patent: Jul. 12, 2022

(54) AIR CONTROLLED ELECTROSPRAY MANUFACTURING AND PRODUCTS THEREOF

(71) Applicant: Cornell University, Ithaca, NY (US)

(72) Inventors: Yong Lak Joo, Ithaca, NY (US); Yevgen Zhmayev, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 1035 days.

(21) Appl. No.: 15/775,732

(22) PCT Filed: Nov. 10, 2016

(86) PCT No.: PCT/US2016/061235
§ 371 (c)(1),
(2) Date: May 11, 2018

(87) PCT Pub. No.: WO2017/083462
PCT Pub. Date: May 18, 2017

(65) Prior Publication Data
US 2018/0369839 A1    Dec. 27, 2018

Related U.S. Application Data

(60) Provisional application No. 62/354,366, filed on Jun. 24, 2016, provisional application No. 62/254,405, (Continued)

(51) Int. Cl.
*B32B 9/00*    (2006.01)
*B05B 5/03*    (2006.01)
(Continued)

(52) U.S. Cl.
CPC ............... *B05B 5/03* (2013.01); *B05D 1/04* (2013.01); *B05D 1/06* (2013.01); *B05D 5/08* (2013.01);
(Continued)

(58) Field of Classification Search
CPC ........ Y10T 428/30; B82Y 30/00; B32B 9/007
(Continued)

(56) References Cited

U.S. PATENT DOCUMENTS

2008/0003374 A1   1/2008   Borra et al.
2008/0083873 A1   4/2008   Giardina
(Continued)

FOREIGN PATENT DOCUMENTS

CN    103265012 A    8/2013
CN    104592535 A    5/2015
(Continued)

OTHER PUBLICATIONS

Partial Supplementary European Search Report for Application PCT/US2016061235, EPO, dated Jun. 24, 2019.

*Primary Examiner* — Daniel H Miller
(74) *Attorney, Agent, or Firm* — Johnson, Marcou, Isaacs & Nix, LLC; Paul J. Roman, Jr.

(57) ABSTRACT

Provided in certain embodiments herein are gas controlled electrospray systems and processes for manufacturing depositions, such as thin layer films. In some embodiments, processes and systems provided herein are suitable for and configured to manufacture uniform depositions, such as having uniform thickness.

22 Claims, 14 Drawing Sheets

Related U.S. Application Data filed on Nov. 12, 2015, provisional application No. 62/254,392, filed on Nov. 12, 2015.

(51) Int. Cl.

| | |
|---|---|
| *C08L 101/00* | (2006.01) |
| *B05D 1/04* | (2006.01) |
| *C09D 7/61* | (2018.01) |
| *C09D 7/20* | (2018.01) |
| *C09D 7/40* | (2018.01) |
| *B05D 1/06* | (2006.01) |
| *C09D 129/04* | (2006.01) |
| *B05D 5/08* | (2006.01) |
| *B05D 3/04* | (2006.01) |
| *B82Y 30/00* | (2011.01) |

(52) U.S. Cl.
CPC .............. *C08L 101/00* (2013.01); *C09D 7/20* (2018.01); *C09D 7/61* (2018.01); *C09D 7/67* (2018.01); *C09D 129/04* (2013.01); *B05D 3/042* (2013.01); *B05D 2601/20* (2013.01); *B82Y 30/00* (2013.01); *Y10T 428/30* (2015.01)

(58) Field of Classification Search
USPC ........................................ 428/408; 423/447.1
See application file for complete search history.

(56) References Cited

U.S. PATENT DOCUMENTS

| | | |
|---|---|---|
| 2009/0152371 A1 | 6/2009 | Stark et al. |
| 2012/0153143 A1 | 6/2012 | Kennedy et al. |
| 2012/0219841 A1 | 8/2012 | Bolandi et al. |
| 2013/0040140 A1 | 2/2013 | Joo et al. |
| 2013/0209793 A1 | 8/2013 | Delgado Sanchez et al. |
| 2013/0236715 A1 | 9/2013 | Zhamu et al. |
| 2014/0272172 A1* | 9/2014 | Zhamu ................ H01L 51/0021 427/457 |
| 2014/0272199 A1 | 9/2014 | Lin et al. |
| 2015/0056471 A1 | 2/2015 | Joo et al. |
| 2015/0329741 A1 | 11/2015 | Yoo et al. |

FOREIGN PATENT DOCUMENTS

| | | |
|---|---|---|
| CN | 104876209 A | 9/2015 |
| DE | 10051907 A1 | 7/2001 |
| EP | 0157407 A2 | 10/1985 |
| JP | H0361353 A | 3/1991 |
| KR | 101521552 B1 | 5/2015 |
| WO | 2014160045 A1 | 10/2014 |

* cited by examiner

A

B

AIR CONTROLLED ELECTROSPRAY MANUFACTURING AND PRODUCTS THEREOF

CROSS-REFERENCE

This application claims the benefit of U.S. Provisional Application Nos. 62/254,392, filed Nov. 12, 2015, 62/254,405, filed Nov. 12, 2015, and 62/354,366, filed Jun. 24, 2016, all of which are incorporated herein by reference in their entireties.

FIELD OF THE INVENTION

The field relates films, coatings and depositions, particularly as prepared by electrospray techniques.

BACKGROUND OF THE INVENTION

Conventional electrospray is effective in creating small charged drops for ionization, atomization and aerosol applications, but inefficient at forming uniform and/or thin coatings and films, particularly at high throughput production rates.

SUMMARY OF THE INVENTION

Provided in certain embodiments herein are systems and processes for manufacturing depositions (e.g., films or coatings), such as thin layer depositions (films or coatings). In some embodiments, processes and systems provided herein are suitable for and configured to manufacture uniform depositions, such as having uniform thickness. In further or alternative embodiments, systems and processes provided herein are exceptionally suitable for and configured to manufacture two (or more) component systems, or one component systems, wherein distribution of the components is highly uniform.

In certain embodiments, provided herein is a process for manufacturing an material (e.g., film or coating), the process comprising generating a plume or aerosol from a fluid stock. Generally, the fluid stock comprises a liquid and an optional inclusion, such as a micro- and/or nano-structured solid particles, a metal precursor, a ceramic precursor, a polymer, or the like, or a combination thereof. In specific embodiments, the plume or aerosol is generated using a suitable technique, such as an electrospray technique. In some embodiments, the process further comprises generating the plume or aerosol in the presence of a high velocity gas. In specific instances, the high velocity gas facilitates the fine dispersion of the plume or aerosol particulates, which, in turn, facilitates the controlled and uniform deposition of the liquid and/or inclusion parts on a substrate surface. In some instances, the direction of the flow of the gas and the plume/aerosol are in the same general direction (e.g., having a directional mean within 15 degrees, 10 degrees, 5 degrees, or the like of each other).

In some embodiments, provided herein is a system or process for manufacturing a deposition (e.g., a thin layer deposition (e.g., film or coating), such as having a thickness of about 50 nm to about 1 mm, e.g., about 1 micron to about 1 mm). In some embodiments, thicker depositions (e.g., films or coatings) are also contemplated (e.g., about 1 mm to about 50 mm). In certain embodiments, the system is configured to or the process comprises injecting a fluid stock into a gas stream. In specific embodiments, the fluid stock is injected into the gas stream in a substantially parallel direction (e.g., within about 10 degrees, about 5 degrees, about 2 degrees, or the like of parallel). In specific embodiments, the process comprising producing an electrostatically charged plume. In more specific embodiments, the plume comprises a plurality of nanoscale particles and/or droplets (e.g., <10 micron in average dimension or diameter). In still more specific embodiments, the particles or droplets (e.g., nanoscale droplets (e.g., the droplets comprising solutions, suspensions, solution-suspensions, and/or solid particles)) comprise an additive and a liquid medium. In certain embodiments, micro-scale droplets are present in the plume, such as when larger additive inclusions are utilized, larger droplets are produced by processes herein. In some embodiments, plumes described herein comprise micro-scale particles or droplets, such as having an average dimension or diameter of at least 2 micron (e.g., about 10 micron to about 250 micron, about 10 micron to about 100 micron, or the like).

In some embodiments, the plume is generated by: providing a fluid stock to a first inlet of a first conduit of an electrospray nozzle. In specific embodiments, the first conduit being enclosed along the length of the conduit by a wall having an interior surface and an exterior surface, the first conduit having a first outlet. In some embodiments, the fluid stock comprises a liquid medium and an additive. In certain embodiments, the process comprises providing a (e.g., direct current) voltage to the nozzle (e.g., wall of the first conduit). In some instances, the voltage provides an electric field (e.g., at the first outlet) (e.g., which field at least partially drives the electrospraying process). In further or additional embodiments, the process further comprises providing a pressurized gas (e.g., provided from a gas supply, such as a pump, a pressurized reservoir, or the like) (e.g., a system being configured to provide a pressurized gas) to a second inlet of a second conduit of the nozzle, e.g., thereby providing high velocity gas at a second outlet of the second conduit (e.g., the high velocity gas having a velocity of about 0.1 m/s or more, about 0.5 m/s or more, about 1 m/s or more, about 5 m/s or more, about 50 m/s or more, or the like). In some embodiments, the second conduit is enclosed along the length of the conduit by a second wall having an interior surface, the second conduit having a second inlet and a second outlet. Generally, the second conduit has a second diameter, and the first conduit is positioned inside the second conduit. In specific embodiments, the exterior surface of the first wall and the interior surface of the second wall are separated by a conduit gap (e.g., the ratio of the conduit overlap length to the first diameter being about 1 to 10). In specific embodiments, the droplets (e.g., partially or wholly dried in the plume) are collected on a substrate (e.g., as a dry or semi-wet deposition (e.g., a coherent film) on the substrate). In some embodiments, the substrate is a grounded collector. In other embodiments, the substrate is configured between a grounded collector and the nozzle.

In some instances, ejecting of a fluid stock (e.g., charged fluid stock) from a nozzle (e.g., electrospray nozzle) produces a fluid jet, which is disrupted to form a plume comprising a plurality of droplets (or plume particulates). In certain instances, such droplets are in varying states of dryness (e.g., wherein more dry droplets comprise less fluid medium relative to solid inclusion materials) as they move toward a collector, with the droplets near the collector being dryer (i.e., comprising less fluid medium) (or even completely dry) than those droplets near the nozzle. In some instances, the plume comprises (e.g., especially in closest proximity to the collector substrate) droplets wherein all fluid medium has been evaporated. In preferred embodiments, plume droplets (particularly in proximity to the collector substrate surface) are disrupted and small enough to reduce or minimize the number and/or amount of inclusions included within each droplet. In certain instances, reducing and/or minimizing the number and/or amount of inclusions in each droplets facilitates good distribution of inclusion throughout the plume, particularly in proximity to the collector. In some instances, good distribution of inclusions within the plume facilitates good distribution of inclusions as collected on the collector substrate. In particular, films and coatings suffer from poor performance characteristics due to lack of uniformity of the film or coating (e.g., due to variations in dispersion and/or concentration of inclusions/additives, variations in film/coating thickness, etc.).

In some instances, typical spray techniques are insufficient to adequately disrupt and break apart the droplets of the plume and are insufficient to provide good distribution of the inclusion materials in the plume and on the collector substrate so as to provide dispersions with good uniformity, particularly in systems comprising multiple inclusion types. Instead, typical spray techniques have been observed to produce particle agglomerations, including co-agglomerations with poor dispersion uniformity and control, without which resultant materials exhibit poor or insufficient performance characteristics.

In certain instances, processes herein comprise generating a plume or aerosol (e.g., electrospraying a fluid stock) with a high velocity gas (e.g., ≥0.1 m/s, ≥0.5 m/s, ≥1 m/s, ≥5 m/s, ≥10 m/s, ≥20 m/s, ≥25 m/s, ≥50 m/s). In some instances, an electrostatically charged fluid stock is injected into a stream of high velocity gas. In certain instances, the high velocity gas facilitates further disruption (e.g., breaking apart) of the droplets formed during electrospray of the fluid stock. In some embodiments, droplets of the plume comprise (e.g., on average) less than 100 inclusions (e.g., sum of inclusion(s) in the droplets), less than 50 inclusions, less than 20 inclusions, less than 10 inclusions or the like. In specific embodiments, the collector is a distance d away from the nozzle and the droplets of the plume within d/2, d/3, or d/4 away from the collector comprise (e.g., on average) about 100 inclusions or less, about 50 inclusions or less, about 20 inclusions or less, about 10 inclusions or less, about 5 inclusions or less, about 3 inclusions or less, or the like. In some instances, the good dispersion of the droplets and the low concentration of inclusions per droplets facilitates the formation of a well-dispersed and well-controlled systems (e.g., multi-component systems), such as described herein.

In specific embodiments, electrospraying of the fluid stock or producing an electrostatically charged plume of the fluid stock comprises (i) providing a fluid stock to a first inlet of a first conduit of an electrospray nozzle, the first conduit being enclosed along the length of the conduit by a wall having an interior surface and an exterior surface, the first conduit having a first outlet; and (ii) providing a voltage to the electrospray nozzle (e.g., thereby providing an electric field). In some embodiments, the fluid stock comprises a plurality (i.e., more than one) of inclusion particles and fluid medium (e.g., an aqueous medium, such as comprising water). In specific embodiments, the inclusion particles have at least one average dimension (e.g., overall average dimension or average smallest dimension) of less than 100 micron (μm) (e.g., about 1 nm to about 50 micron) (e.g., less than 50 micron, less than 20 micron, less than 10 micron, 0.2 micron to 10 micron, or less than 0.2 micron (200 nm)) (e.g., the smallest dimension).

In certain embodiments, processes and systems described herein are suitable for high throughput of heavily loaded fluid stocks. In particular, in some instances, such as wherein electrospray processes occur with a gas stream, higher loading of particles and/or inclusions are possible. In addition, in some embodiments, high concentrations of inclusion components are preferred in order to facilitate good coverage of a surface (of a collector or substrate), good uniformity of films (e.g., thickness, dispersion, etc.), and/or the like. In certain embodiments, the fluid stock provided herein comprises at least 0.1 wt. %, at least 0.5 wt. %, or at least 1 wt. % inclusion component, e.g., at least 2 wt. % inclusion component, at least 2.5 wt. % inclusion component, at least 3 wt. % inclusion component, at least 5 wt. % inclusion component, or the like (e.g., up to 50 wt. %, up to 30 wt. %, up to 20 wt. %, up to 15 wt. %, up to 10 wt. %, or the like). In certain embodiments, the fluid stock comprises about 2 wt. % to about 15 wt. % (e.g., about 10 wt. % to about 15 wt. %) inclusion component.

In certain embodiment, processes provided herein further comprise collecting a composition (e.g., a deposition or film (e.g., a film being a layer of material, such as prepared by a deposition technique described herein) resulting from the spraying of a fluid stock as described herein) on a substrate. In specific embodiments, the composition or deposition comprises a plurality inclusions, such as described in the fluid stock herein. In certain embodiments, the fluid of the fluid stock is partially or completely removed (e.g., by evaporation during the electrospray process).

Any suitable substrate is optionally utilized. In some instances, the substrate is a grounded substrate or positioned between a plume generating nozzle and a grounded surface. In certain embodiments, the substrate has a surface that is positioned in opposing relation to a plume generating nozzle outlet (e.g., there is "line of sight" between the nozzle outlet and the substrate surface). In specific embodiments, the opposing substrate is directly opposing the nozzle (e.g., configured orthogonal to nozzle conduit configuration, such as illustrated in FIG. 3). In other specific embodiments, the opposing substrate is angled or offset from directly opposing the nozzle. In some embodiments, the substrate is affixed to or is a part of a conveyor system (e.g., to facilitate continuous manufacturing of coatings, films, or the like). In specific embodiments, the substrate is attached to a conveyor belt or is a part of a conveyor belt.

In certain embodiments, a process described herein is a gas assisted or gas controlled process. In some embodiments, a fluid stock provided herein is sprayed with a gas stream. In specific embodiments, a fluid stock described herein is injected into a gas stream during electrospraying. In some embodiments, a process of producing of an electrostatically charged plume from a fluid stock further comprises providing a pressurized gas to a second inlet of a second conduit of a nozzle described herein. In specific embodiments, the second conduit has a second inlet and a second outlet, and at least a portion of the first conduit being positioned inside the second conduit (i.e., at least a portion of the second conduit being positioned in surrounding relation to the first conduit). In certain embodiments, the gap between the outer wall of the inner conduit and the inner wall of the outer conduit is small enough to facilitate a high velocity gas at the nozzle, such as to facilitate sufficient disruption of the charged fluid (jet) ejected from the nozzle (e.g., such as to provide plume or aerosol dispersions described herein). In some embodiments, the conduit gap is about 0.01 mm to about 30 mm, such as about 0.05 mm to about 20 mm, about 0.1 mm to about 10 mm, or the like. In certain embodiments, the gas stream (e.g., at the second outlet) has a high velocity, such as a velocity of at least 0.5 m/s, e.g., at least 1 m/s, at least 5 m/s, at least 10 m/s, at least 20 m/s, or more.

In some instances, a process provided herein comprises compressing of a film described herein. In certain embodiments, the film is compressed such as to provide a compressed composition having a density of about 0.05 g per cubic centimeter (g/cc) or greater, such as about 0.1 g/cc or greater, about 0.2 or greater, or the like. In various embodiments, films (e.g., collected, and/or compressed compositions) provided herein have any suitable thickness, such as an average thickness of about 1 mm or less, or about 500 micron or less (e.g., on the substrate). In some embodiments, very thin films are provided herein, such as having an average thickness of about 250 micron or less, about 200 micron or less, about 150 micron or less, about 100 micron or less, about 50 micron or less, about 25 micron or less, or about 20 micron or less (e.g., down to about 1 micron, down to about 5 micron, down to about 10 micron, or the like).

In certain embodiments, the inclusion particles have an average aspect ratio of 1 to about 100, such as 1 to about 10. In further or alternative embodiments, inclusion particles have an average dimension (or an average smallest dimension) of about 100 micron or less, about 50 micron or less, about 20 micron or less, about 10 micron or less, e.g., about 200 nm to about 10 micron, or about 1 micron to about 5 micron.

The processes and systems provided herein are highly versatile and are optionally utilized to manufacture a number of different types of depositions and/or coatings (e.g., coherent film coatings). In specific embodiments, the processes and/or systems provided herein are utilized to manufacture a deposition (e.g., thin layer deposition) comprising a matrix material, such as a polymer (e.g., as a coherent film), a ceramic, or the like. In more specific embodiments, an inclusion (e.g., nano-inclusion) dispersed within the matrix (e.g., polymer film). In still more specific embodiments, the dispersion of the inclusion (e.g., nano-inclusion) in the matrix material is highly uniform. In yet more specific embodiments, the uniformity of dispersion is such that the most probable distance between inclusions (e.g., nano-inclusions) ranges from about 20 nm or more, or about 50 nm or more, or about 100 nm or more, or about 100 nm to about 1000 nm.

In further or alternative embodiments, depositions provided herein have uniform thickness (e.g., the systems and/or processes provided herein provide even distribution of droplets over the target surface area, and/or deliver small droplets to the surface, minimizing "high spots" caused by large droplets/particle deposition). In specific embodiments, the deposition (e.g., thin layer deposition) has a thickness variation (e.g., in a selected area, such as when an entire surface is not coated, such as an area that is not near the edge of the coating, e.g., an area that is more than 10% or 20% of the length, width, or diameter away from the edge of the coating) of less than about 100% of the average deposition thickness, e.g., about 50% or less of the average deposition thickness, about 20% or less of the average thickness, about 10% or less of the average thickness, about 5% or less of the average thickness, or the like. In some embodiments, the standard deviation of the film thickness is less than 200% the average thickness, less than 100% the average thickness, less than 50% the average thickness, less than 20% the average thickness, or the like.

In some embodiments, provided herein is a thin film comprising at least 20% by weight of a solid particulate additive described herein (e.g., particles, nanoparticles, carbon inclusions (e.g., graphene oxide), and/or the like). In specific embodiments, such thin films have uniform thicknesses, such as described herein. In some embodiments, such thin films comprise at least 40% solid particulate by weight (e.g., at least 50%, at least 60%, at least 70%, at least 80%, at least 90%, at least 95%, at least 98%, or the like). In various embodiments, such thin films have an average thickness as described herein, such as about 500 micron or less, about 200 micron or less, about 100 micron or less, about 50 micron or less, or the like.

As discussed herein, in certain embodiments, a fluid stock provided herein comprises a liquid medium and an additive. The additive is optionally present in the fluid stock in any suitable concentration, such as up to about 80 wt. %, e.g., up to about 70 wt. % (e.g., about 1 wt. % or more, about 5 wt. % or more, about 10 wt. % or more, about 20 wt. % or more, or the like). In specific embodiments, the additive is present in the fluid stock in a concentration of about 5 wt. % to about 50 wt. %. In certain instances, overall concentration of additive is capable of being very high due to the ability of the process herein to process high concentration and highly viscous stocks that are not possible using typical techniques.

In specific embodiments, the additive comprises a polymer (e.g., in a concentration low enough such that a nanofiber is not formed upon manufacturing using a process and/or system described herein). In specific embodiments, the concentration of the polymer in the fluid stock is about 5 wt. % or less (e.g., about 0.5 wt. % to about 5 wt. %). While any suitable polymer is optionally utilized, specific polymers include, by way of non-limiting example, polycarbonate (PC), poly(methyl methacrylate) (PMMA), polyethylene terephthalate (PET), polystyrene (PS), acrylonitrile butadiene styrene (ABS), polyacrylonitrile (PAN), polyvinyl acetate (PVAc), polyvinylalcohol (PVA), polyvinylidene fluoride (PVDA), and/or combinations thereof.

In further or alternative embodiments, the fluid stock (and/or depositions provided herein, such as those formed by electrospraying such fluid stocks) comprises an additive that is or comprises a plurality of solid inclusions, such as nano-structures (e.g., nanoparticles, nanorods, nanofibers, and other nano-structured components, such as graphene nanoribbons, carbon nanotubes, and the like). In specific embodiments, the inclusions (e.g., solid nano-structures) comprise a plurality of metal particles (e.g., nanoparticles), ceramic particles (e.g., nanoparticles), metal oxide particles (e.g., nanoparticles), carbon inclusions (e.g., nanostructures), or any combination thereof. In more specific embodiments, the inclusions (e.g., nano-structures) comprise particles (e.g., nanoparticles) comprising metal oxide or ceramic, e.g., silicon oxide, aluminum oxide or a titanium oxide. In further or additional embodiments, the solid inclusions comprise carbon inclusions (e.g., nanostructured carbon inclusions, or carbon nanostructures). In specific embodiments, carbon inclusions include, by way of non-limiting example, carbon nanotubes, graphene nanoribbons, carbon nanofibers, mesoporous carbon nanostructures, graphene oxide (e.g., sheets or nanoribbons), and/or any combination thereof.

In further or alternative embodiments, the fluid stock comprises (e.g., as a liquid medium and/or additive) polysilazane, silsesquioxane (e.g., polyhedral oligomeric silsesquioxane (POSS), or polysilsesquioxane (PSSQ)), and/or combinations thereof.

In some embodiments, the fluid stock comprises a liquid medium, e.g., the liquid medium serving to dissolve and/or suspend the additives. Any suitable liquid medium is optionally used, but in specific embodiments, the liquid medium is or comprises, by way of non-limiting example, water, an alcohol, dimethylformamide (DMF), tetrahydrofuran (THF), Dimethylacetamide (DMAc), dicloromethane (DCM), chloroform, or N-methyl-pyrrolidone (NMP). As discussed herein, in some embodiments, the liquid medium is utilized to dissolve and/or suspend additives described herein. In some instances, e.g., to facilitate uniformity of the fluid stock (e.g., solutes and/or suspended agents therein), the fluid stock is agitated (e.g., by stirring, sonicating, and/or any other suitable mechanism) prior to being provided to the first inlet.

In certain embodiments, any suitable nozzle system configuration is acceptable. In specific embodiments, the first diameter is about 0.1 mm to about 10 mm (e.g., about 0.15 mm to about 8 mm, or about 0.15 mm to about 5 mm). In further or alternative embodiments, the second diameter is any suitable diameter that is larger than the first diameter. In specific embodiments, the second diameter is about 0.2 mm to about 15 mm (e.g., about 2 mm to about 8 mm). In certain embodiments, the conduit gap (the average distance between the exterior surface of the inner conduit wall and the interior surface of the outer conduit wall) is any suitable distance, such as a distance configured to allow suitable airflow quantity and/or velocity to the nozzle tip and beyond to break up and/or otherwise facilitate reducing the size of the droplets produced by the spraying process and/or system. In specific embodiments, the conduit gap is about 0.1 mm or more (e.g., about 0.5 mm or more). In certain embodiments, the spraying process and/or system provided herein comprises applying and/or is configured to provide a voltage to the nozzle, the voltage being about 8 kV to about 30 kV (e.g., about 10 kV to about 25 kV). In certain embodiments, a power supply is configured to provide a voltage to the nozzle. In some instances, higher voltage are optionally utilized when a voltage is applied to nozzle system comprising a number of nozzles. In some embodiments, if appropriate, a voltage is optionally not applied to a system and/or process provided herein.

In certain embodiments, processes and/or systems provided herein allow high flow rates (e.g., relative to other spray systems). In specific embodiments, the flow rate of the fluid stock (e.g., provided to the first inlet of the nozzle) is about 0.05 or more (e.g., about 0.05 mL to about 5 mL/min, about 0.1 mL or more, about 0.5 mL or more, about 1 mL or more, or the like). In certain embodiments, processes and/or systems provided herein allow the processing of highly viscous fluids (e.g., relative to other spray systems). For example, in some embodiments, the viscosity of a fluid stock provided herein is about 1 cP or more, about 5 cP or more, about 10 cP or more, about 20 cP or more, and/or up to 10 Poise or more.

In certain embodiments, provided herein is a process for producing a deposition (e.g., a thin layer deposition), the process comprising coaxially electrospraying a fluid stock with a gas, thereby forming a jet, and a plume, the gas at least partially surrounding the jet, the plume comprising a plurality of droplets (e.g., nanodroplets), the fluid stock, the jet, and the plume comprising a fluid and an additive, the additive comprising polymer, an inclusion (e.g., a nanoinclusion, also referred to herein as a nanostructure), or a combination thereof.

In specific embodiments, a process or system provided herein is suitable for manufacturing a superhydrophobic surface (e.g., on a substrate such as glass or polycarbonate). In specific embodiments, the fluid stock comprises a liquid medium and an additive, the additive comprising transparent polymer (e.g., polycarbonate) and/or ceramic particle (e.g., silicon oxide, such as silica, nanoparticles (e.g., having a diameter of about 1 micron or less, 100 nm or less, about 50 nm or less, about 20 nm or less, or about 5 nm to about 10 nm)). In specific embodiments, the superhydrophobic surface has a water contact angle of about 130 degrees or more, or about 135 degrees or more. In more specific embodiments, the fluid stock comprises a transparent polymer and ceramic particles (e.g., silicon oxide, such as silica, nanoparticles). In further or alternative embodiments, the fluid stock (or additive thereof) further comprises a polysilazane (or a sol, sol gel, or ceramic thereof), and/or a silsesquioxane (e.g., polyhedral oligomeric silsesquioxane (POSS), or polysilsesquioxane (PSSQ)). In still further or alternative embodiments, the fluid stock (or additive thereof) comprises fluroalkyl silane or perflouropolyether alkoxy silane. In specific embodiments, fluid stock comprises (or a process provided herein comprises combining into a fluid stock) polycarbonate, ceramic particles (e.g., silica nanoparticles), organic polysilazane, and fluoroalkyl silane. In specific embodiments, the ratio of polycarbonate to ceramic particles (e.g., silica nanoparticles) to organic polysilazane to fluoroalkyl silane being about 1 to about 50 weight parts polycarbonate to about 5 to about 95 weight parts ceramic particles (e.g., silicon, such as silica, nanoparticles) to about 1 to about 99 weight parts organic polysilazane to about 0.05 to about 5 weight parts fluoroalkyl silane.

As provided herein are articles of manufacture, such as those having one or more glass or polycarbonate surface, at least one surface being coated with a surface coat, the coated surface having a water contact angle of at least 130 degrees, and the surface coat comprising polycarbonate and ceramic particles (e.g., silica nanoparticles) (and, optionally a polysilazane or silsesquioxane, or ceramic resulting from the curing thereof, and/or a fluoro-compound (e.g., associated with the ceramic particles (e.g., silica nanoparticles)), such as described herein).

In addition, provided herein are scalable manufacturing processes for the fabrication of new materials (e.g., depositions) with tailored nanostructures, e.g., meeting an unmet need. In some embodiments, processes and systems provided herein (e.g., gas controlled electrospray processes and systems) employ high speed, circumferentially uniform air flow that can provide enhanced deformation of electrospray droplets (and/or particles), offering a high production rate (tens to hundreds of folds higher than other electrospray techniques), better control of dispersion of inclusions (e.g., nanoinclusions) in the droplets, and/or better control of directing droplets toward a collector with more uniform and thin depositions (e.g., films and coatings).

In addition, provided herein are the various compositions prepared by, preparable by, or otherwise described in the processes herein. In some instances, provided herein are films, plumes or aerosols, fluid stocks, systems comprising any one or more of the same, and the like described herein.

These and other objects, features, and characteristics of the system and/or process disclosed herein, as well as the processes of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, unless otherwise stated, values and characteristics described for individual components herein also include disclosure of such values and characteristics as an average of a plurality (i.e., more than one) of such components. Similarly, disclosure of average values and characteristics herein also includes a disclosure of an individual value and characteristic as applied to a single component herein.

DETAILED DESCRIPTION OF THE INVENTION

Provided in certain embodiments herein are systems and processes for manufacturing depositions, and the like. In some instances, depositions provided herein are thin layer depositions, which are suitable for any number of applications. In various embodiments, the depositions are coatings (e.g., films) comprising a matrix material (e.g., polymer or ceramic) and optionally further comprising inclusions (e.g., nanostructured inclusions). In some embodiments, the inclusions are dispersed in and/or on the matrix. In other embodiments, depositions provided herein are coatings comprising a plurality of structures, such as nanostructures (e.g., the nanostructures forming the coating and being dispersed on a substrate). Also provided in some embodiments herein are articles of manufacture comprising a deposition (e.g., film) or coat, e.g., a thin-layered coat manufactured or capable of being manufactured according to the processes described herein. In certain embodiments, provided herein is a substrate comprising a coating or deposition described herein on the surface thereof.

In some embodiments, provided herein is a process for producing a thin layer deposition, the process comprising electrospraying a fluid stock with a gas (e.g., a controlled gas flow). In certain embodiments, the fluid and the gas are ejected from an electrospray nozzle in a similar direction. In some instances, the direction of ejection of the fluid stock and the gas from the electrospray nozzle is within about 30 degrees of one another, or, more preferably within about 15 degrees of one another (e.g., within about 10 degrees or within about 5 degrees of one another). In certain embodiments, the fluid stock and the gas are configured to be ejected from the nozzle in a coaxial configuration. In some instances, configurations and processes described herein allow for an enhanced driving force of electrospray, combining the driving forces of electric field gradient with high speed gas. In certain instances, configurations and processes described herein provided for several improvements in electrospray processing, including in the manufacture of depositions, such as described herein. In addition, in some instances, such configurations allow for process throughput up to tens or hundreds of times greater than simple electrospray manufacturing and allow for the electrospray of high viscosity and/or highly loaded fluids. Moreover, in some instances, such electrospray techniques and systems allow for the manufacture of highly uniform depositions and coatings. By contrast, other or conventional electrospray is not generally of commercial use in coatings applications because of, e.g., non-uniform deposition of drops and dispersion of fillers in droplets, especially for high loaded systems.

Figure 1:
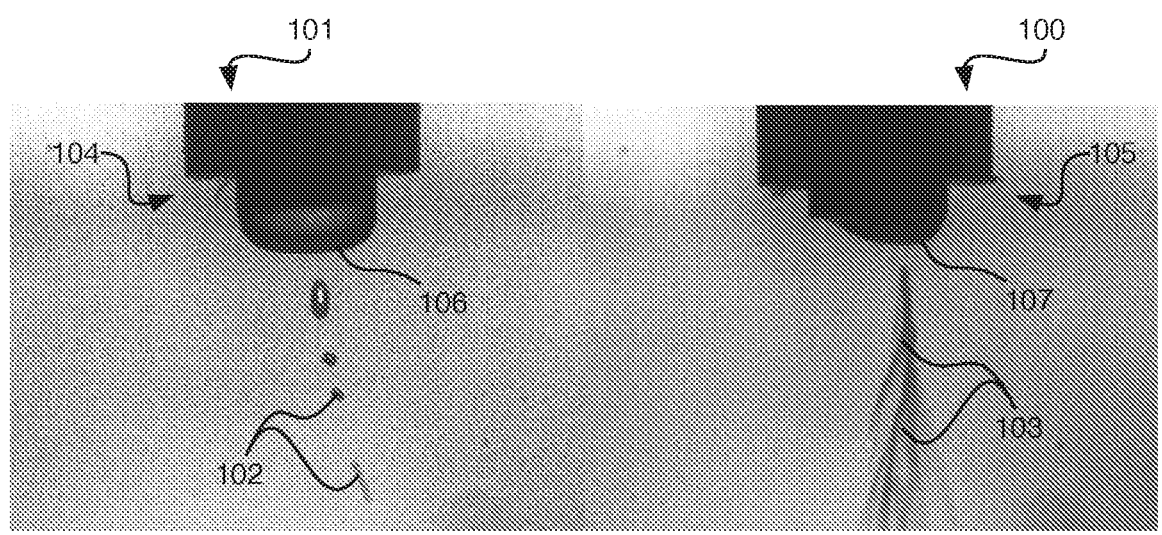
FIG. 1 illustrates high speed imaging of electrospray of a fluid stock using non-gas assisted electrospray techniques (left panel) and an exemplary gas controlled electrospray technique provided herein (right panel).
Figure 2:
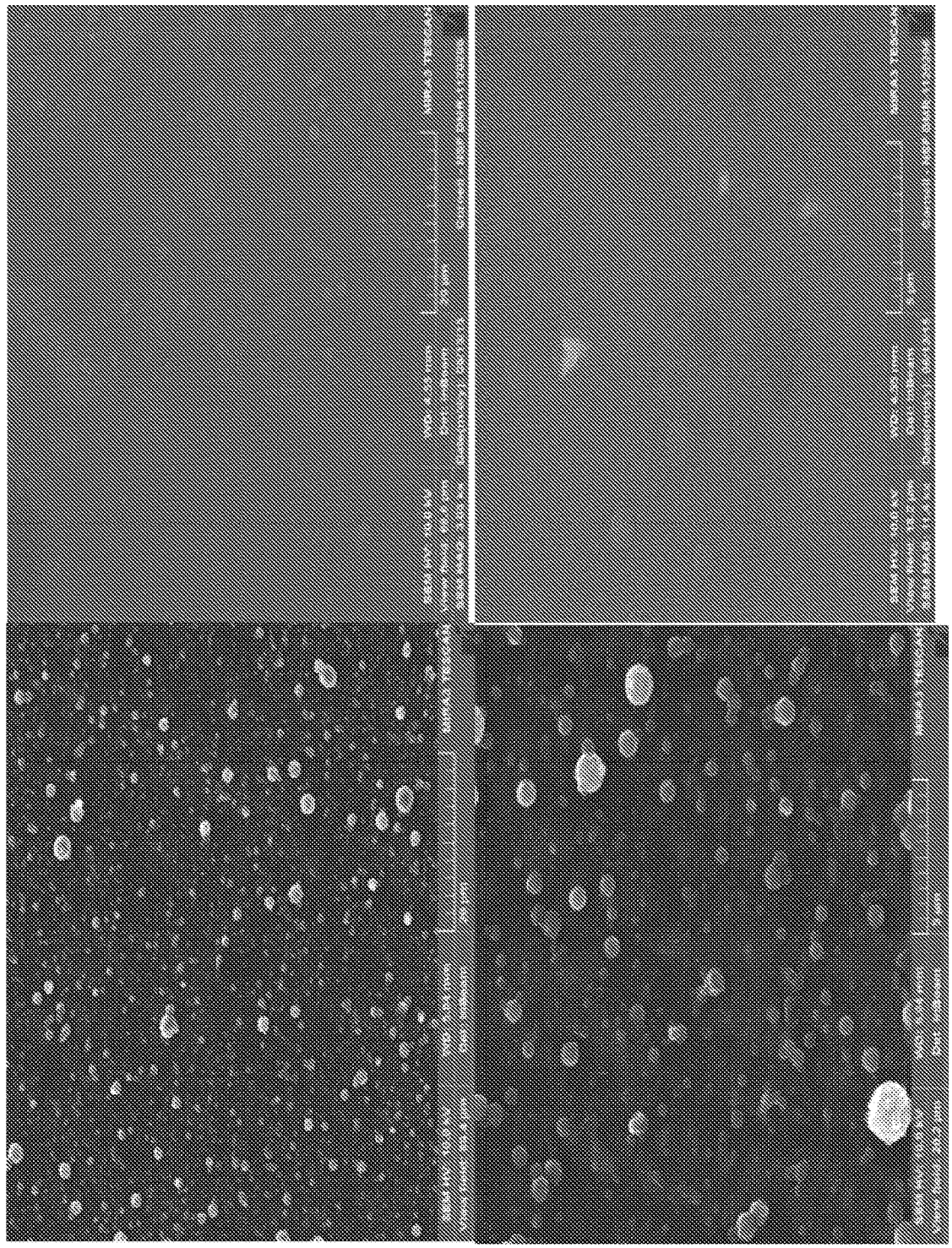
FIG. 2 illustrates depositions manufactured by an exemplary conventional electrospray techniques (left panels) and an exemplary gas controlled electrospray process provided herein (right panels).

In some instances, electrospray (e.g., using a process and/or system provided herein) of the fluid stock results in the formation of a jet, which subsequently deforms into a plume comprising a plurality of droplets (collectively referred to herein so as to encompass, e.g., droplet solutions, droplet suspensions, and/or solid particles in an plume or aerosol). In certain instances, electrospray (e.g., using a process and/or system provided herein) of a fluid stock, such as provided herein results in the formation of a plume comprising a plurality of droplets (collectively referred to herein so as to encompass, e.g., droplet solutions, droplet suspensions, and/or solid particles in an electrospray plume). In some instances, the processes described herein results in the formation of small droplets (e.g., micro- or nano-scale droplets) having highly uniform size distributions (e.g., especially relative to standard electrospray techniques. FIG. 1 illustrates high speed imaging of electrospray of a fluid stock using conventional electrospray techniques 101 and an exemplary gas controlled electrospray technique provided herein 100. As illustrated in FIG. 1, the "plume" of the conventional electrospray process near the nozzle 104 comprises much larger droplets 102 having a less uniform size distribution than the droplets 103 of the plume resulting near the nozzle 105 of the gas controlled electrospray processes described herein. In some instances, smaller and more uniform droplet size provides improved uniformity of depositions, such as illustrated in FIG. 2. FIG. 2 illustrates depositions manufactured by an exemplary conventional electrospray techniques (left panels) and an exemplary gas controlled electrospray process provided herein (right panels). As illustrated in FIG. 2, depositions formed by conventional electrospray techniques provide depositions that are not uniform and comprise large particles, relative to the depositions formed by exemplary gas controlled electrospray systems and processes described herein. FIG. 11 shows an exemplary illustration of a gas controlled electrospray system provided herein 1100 and an exemplary illustration of a non-gas controlled electrospray system 1120. In some instances, a non gas-controlled system results, upon spraying from a nozzle 1121, in the formation of large droplets 1122, which droplets are large and not well dispersed in the "plume" and irregular depositions 1123 on the collector 1124. This illustration is further demonstrated in FIGS. 1 and 2 by the high speed imaging of spraying 101 (FIG. 1), and as collected (FIG. 2, left panels). By contrast, in some embodiments, gas-controlled systems (and processes) provided herein provide electrospray of a fluid stock with a gas (illustrated by the downward arrows) 1101 (e.g., having a controlled flow, such as circumferentially configured with the dispensing of the fluid stock) from a nozzle 1102 (e.g., coaxially arranged, as illustrated in FIG. 11). In some embodiments, with the flow of air, the droplets 1103 proximal to the nozzle are smaller relative to non-gas controlled techniques (e.g., in some instances due to the controlled air flow at the nozzle end 1104), and even smaller still as the droplets 1105 move away from the nozzle toward the collector (droplets distal to the nozzle 1106 and/or proximal to a collector 1107). In some embodiments, such uniformity (e.g., uniformity of size, horizontal distribution, etc.) of dispersion of small droplets provides for a deposition 1108 having a greatly improved uniformity of thickness, dispersion of inclusions, etc. This illustration is further demonstrated in FIGS. 1 and 2 by the high speed imaging of spraying 101 (FIG. 1), and as collected (FIG. 2, right panels).

In certain instances, uniformity in the plume/aerosol allows for much greater control of deposition formation, such as thickness, thickness uniformity, compositional uniformity (e.g., in composites), and the like. In certain embodiments, films provided herein have an average thickness ($d_f$) that is about 10 mm or less, such as about 5 mm or less, about 2 mm or less, or about 1 mm or less. In certain embodiments, such as wherein the film is utilized as coating, such as a transparent coating, the thickness of the film is about 500 micron (micrometer, μm) or less, such as about 250 micron or less, about 200 micron or less, about 100 micron or less, about or the like (e.g., down to about 50 nm, about 100 nm, about 250 nm, about 500 nm, about 1 micron, about 5 micron, about 10 micron, 25 micron, 50 micron, 100 micron, or the like, depending on the desired thickness). In some embodiments, the thickness of the film is controlled by limiting or lengthening the residence time of a collector surface opposite an active nozzle system (e.g., using batch or continuous (e.g., using a conveyor) system). In certain embodiments, the films provided herein have good thickness uniformity, such as wherein the thinnest portion of the film is $>d_f/10$, $>d_f/5$, $>d_f/4$, $>d_f/3$, $>d_f/2$, or the like. In further or alternative embodiments, the thickest portion of the film is $<10\times d_f$, $<5\times d_f$, $<3\times d_f$, $<2\times d_f$, $<1.5\times d_f$, $<1.2\times d_f$, or the like. In preferred embodiments, the minimum thickness of the film is greater than 0.9 $d_f$, (more preferably greater than 0.95 $d_f$) and the maximum thickness of the film is less than 1.1 $d_f$, (more preferably, less than 1.05 $d_f$).

In certain embodiments, a process provided herein comprises producing an electrostatically charged plume comprising a plurality of particles and/or droplets (e.g., an area or section of air comprising a plurality of particles and/or droplets dispersed therein). In specific embodiments, the plurality of particles and/or droplets are (e.g., nanoscaled) particles and/or droplets. In more specific embodiments, the plurality of particles and/or droplets have an average diameter of about 100 microns or less, about 50 microns or less, less than 30 micron, about 20 microns or less, less than 15 micron, or about 10 microns or less. In still more specific embodiments, the plurality of particles and/or droplets have an average diameter of about 5 microns or less, e.g., about 1 micron or less. In certain embodiments, the size of the particles and/or droplets is highly uniform, with the standard deviation of the particle and/or droplet size being about 50% of the average size of the particles and/or droplets, or less (e.g., about 40% or less, about 30% or less, about 20% or less, about 10% or less, or the like) (e.g., at any given distance from the nozzle, e.g., about 10 cm or more, about 15 cm or more, about 20 cm or more, about 25 cm or more, from the nozzle).

In some embodiments, the fluid stock, the jet, and/or the plume comprises a fluid (e.g., water) and an inclusion (e.g., solid particulates, metal and/or ceramic precursors, and/or polymer). In certain embodiments, compositions provided herein comprise a plurality of droplets, a jet, or a fluid stock comprising a fluid (e.g., water) and an inclusion. In various embodiments, individual droplets optionally comprise one or more inclusion type and/or other additive (e.g., polymer). Further, some or all of the fluid of the droplets (of the plume) may be evaporated during the electrospray process (e.g., prior to deposition). In various embodiments, concentrations of inclusion materials in droplets described herein, or a composition comprising the same, are generally higher than the concentrations of such materials in the fluid stock, or even in the jet (where evaporation of the fluid begins). In certain embodiments, droplets or compositions comprising the droplets having inclusions concentrations of at least 1.5×, at least 2×, at least 3×, at least 5×, at least 10×, or the like (e.g., wherein the inclusions make up up to 70 wt. % or more, 80 wt. % or more, 90 wt. % or more, or even 100 wt. % of the droplets or composition/plume comprising the same) of the concentrations of the droplets or composition/plume comprising the same.

In specific embodiments, the plume (e.g., particles and/or droplets thereof) comprise a polymer and/or a plurality of additive particles (e.g., nanoparticles). In certain embodiments, the plume (e.g., particles and/or droplets thereof) further comprises a liquid medium (e.g., wherein the liquid medium of a fluid stock is not completely evaporated). In some embodiments, a process or system provided herein allows for high throughput electrospraying (e.g., relative to other non-gas controlled electrospray techniques). In some instances, the controlled air flow allows for a increase rate and uniformity in dispersion and breaking up of the jet and the plume, allowing for increased fluid stock flow rates, while also increasing deposition uniformity. In various embodiments, the fluid stock is provided to the nozzle at any suitable flow rate, such as about 0.01 mL/min or more, about 0.05 mL/min or more, about 0.1 mL/min or more, about 0.2 mL/min or more, or about 0.01 mL/min to about 10 mL/min. In certain embodiments, the fluid stock is provided to the first inlet at a rate of about 0.01 to about 10 mL/min, e.g., about 0.05 mL/min to about 5 mL/min, or about 0.5 mL/min to about 5 mL/min.

In specific embodiments, an electrospray process described herein comprises providing a fluid stock to a first inlet of a first conduit of an electrospray nozzle, the first conduit being enclosed along the length of the conduit by a wall having an interior surface and an exterior surface, the first conduit having a first outlet. In specific instances, the walls of the first conduit form a capillary tube, or other structure. In some instances, the first conduit is cylindrical, but embodiments herein are not limited to such configurations.

Figure 8:
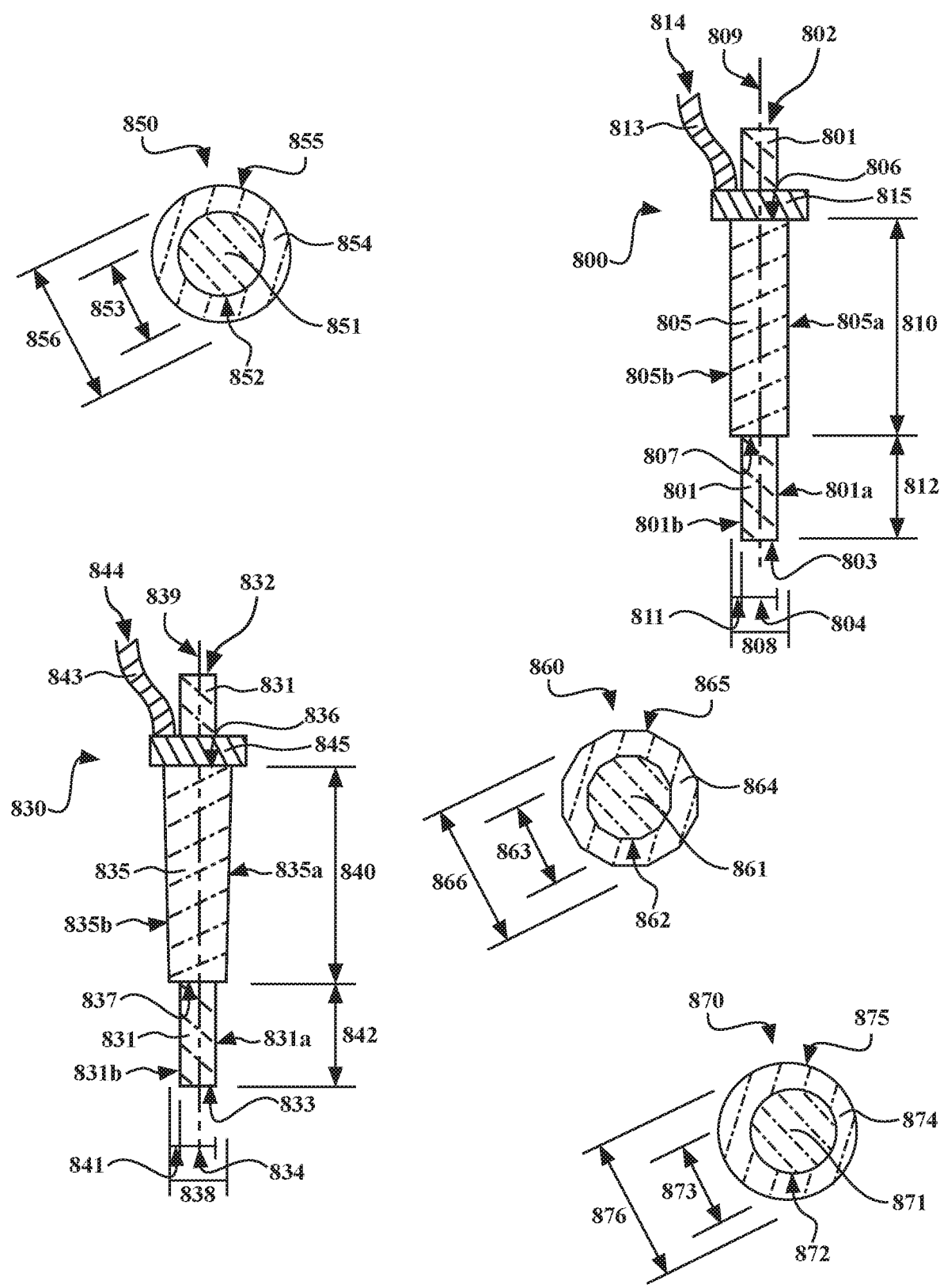
FIG. 8 illustrates exemplary electrospray nozzle apparatuses provided herein.

FIG. 8 illustrates exemplary electrospray nozzle apparatuses 800 and 830 provided herein. Illustrated by both nozzle components 800 and 830 some embodiments, the nozzle apparatus comprises a nozzle component comprising a first (inner) conduit, the first conduit being enclosed along the length of the conduit by a first wall 801 and 831 having an interior and an exterior surface, and the first conduit having a first inlet (or supply) end 802 and 832 (e.g., fluidly connected to a first supply chamber and configured to receive a fluid stock) and a first outlet end 803 and 833. Generally, the first conduit has a first diameter 804 and 834 (e.g., the average diameter as measured to the inner surface of the wall enclosing the conduit). In further instances, the nozzle component comprising a second (outer) conduit, the second conduit being enclosed along the length of the conduit by a second wall 805 and 835 having an interior and an exterior surface, and the second conduit having a second inlet (or supply) end 806 and 836 (e.g., fluidly connected to a second supply chamber and configured to receive a gas—such as a high velocity or pressurized gas (e.g., air)) and a second outlet end 807 and 837. In some instances, the second inlet (supply) end 806 and 836 is connected to a supply chamber. In certain instances, the second inlet (supply) end 806 and 836 are connected to the second supply chamber via a supply component. FIG. 8 illustrates an exemplary supply component comprising a connection supply component (e.g., tube) 813 and 843 that fluidly connects 814 and 844 the supply chamber (not shown) to an inlet supply component 815 and 845, which is fluidly connected to the inlet end of the conduit. The figure illustrates such a configuration for the outer conduit, but such a configuration is also contemplated for the inner and any intermediate conduits as well. Generally, the first conduit has a first diameter 808 and 838 (e.g., the average diameter as measured to the inner surface of the wall enclosing the conduit). The first and second conduits have any suitable shape. In some embodiments, the conduits are cylindrical (e.g., circular or elliptical), prismatic (e.g., a octagonal prism), conical (e.g., a truncated cone—e.g., as illustrated by the outer conduit 835) (e.g., circular or elliptical), pyramidal (e.g., a truncated pyramid, such as a truncated octagonal pyramid), or the like. In specific embodiments, the conduits are cylindrical (e.g., wherein the conduits and walls enclosing said conduits form needles). In some instances, the walls of a conduit are parallel, or within about 1 or 2 degrees of parallel (e.g., wherein the conduit forms a cylinder or prism). For example, the nozzle apparatus 800 comprise a first and second conduit having parallel walls 801 and 805 (e.g., parallel to the wall on the opposite side of the conduit, e.g., as illustrated by 801a/801b and 805a/805b, or to a central longitudinal axis 809). In other embodiments, the walls of a conduit are not parallel (e.g., wherein the diameter is wider at the inlet end than the outlet end, such as when the conduit forms a cone (e.g., truncated cone) or pyramid (e.g., truncated pyramid)). For example, the nozzle apparatus 830 comprise a first conduit having parallel walls 831 (e.g., parallel to the wall on the opposite side of the conduit, e.g., as illustrated by 831a/831b, or to a central longitudinal axis 839) and a second conduit having non-parallel walls 835 (e.g., not parallel or angled to the wall on the opposite side of the conduit, e.g., as illustrated by 835a/835b, or to a central longitudinal axis 839). In certain embodiments, the walls of a conduit are within about 15 degrees of parallel (e.g., as measured against the central longitudinal axis, or half of the angle between opposite sides of the wall), or within about 10 degrees of parallel. In specific embodiments, the walls of a conduit are within about 5 degrees of parallel (e.g., within about 3 degrees or 2 degrees of parallel). In some instances, conical or pyramidal conduits are utilized. In such embodiments, the diameters for conduits not having parallel walls refer to the average width or diameter of said conduit. In certain embodiments, the angle of the cone or pyramid is about 15 degrees or less (e.g., the average angle of the conduit sides/walls as measured against a central longitudinal axis or against the conduit side/wall opposite), or about 10 degrees or less. In specific embodiments, the angle of the cone or pyramid is about 5 degrees or less (e.g., about 3 degrees or less). Generally, the first conduit 801 and 831 and second conduit 805 and 835 having a conduit overlap length 810 and 840, wherein the first conduit is positioned inside the second conduit (for at least a portion of the length of the first and/or second conduit). In some instances, the exterior surface of the first wall and the interior surface of the second wall are separated by a conduit gap 811 and 841. In certain instances, the first outlet end protrudes beyond the second outlet end by a protrusion length 812 and 842. In certain instances, the ratio of the conduit overlap length-to-second diameter is any suitable amount, such as an amount described herein. In further or alternative instances, the ratio of the protrusion length-to-second diameter is any suitable amount, such as an amount described herein, e.g., about 1 or less.

FIG. 8 also illustrates cross-sections of various nozzle components provided herein 850, 860 and 870. Each comprises a first conduit 851, 861 and 871 and second conduit 854, 864, and 874. As discussed herein, in some instances, the first conduit is enclosed along the length of the conduit by a first wall 852, 862 and 872 having an interior and an exterior surface and the second conduit is enclosed along the length of the conduit by a second wall 855, 865 and 875 having an interior and an exterior surface. Generally, the first conduit has any suitable first diameter 853, 863 and 864 and any suitable second diameter 856, 866, and 876. The cross-dimensional shape of the conduit is any suitable shape, and is optionally different at different points along the conduit. In some instances, the cross-sectional shape of the conduit is circular 851/854 and 871/874, elliptical, polygonal 861/864, or the like.

In some instances, coaxially configured nozzles provided herein and coaxial gas controlled electrospraying provided herein comprises providing a first conduit or fluid stock along a first longitudinal axis, and providing a second conduit or gas (e.g., pressurized or high velocity gas) around a second longitudinal axis (e.g., and electrospraying the fluid stock in a process thereof). In specific embodiments, the first and second longitudinal axes are the same. In other embodiments, the first and second longitudinal axes are different. In certain embodiments, the first and second longitudinal axes are within 500 microns, within 100 microns, within 50 microns, or the like of each other. In some embodiments, the first and second longitudinal axes are aligned within 15 degrees, within 10 degrees, within 5 degrees, within 3 degrees, within 1 degree, or the like of each other. For example, FIG. 8 illustrates a cross section of a nozzle component 870 having an inner conduit 871 that is off-center (or does not share a central longitudinal axis) with an outer conduit 874. In some instances, the conduit gap (e.g., measurement between the outer surface of the inner wall and inner surface of the outer wall) is optionally averaged—e.g., determined by halving the difference between the diameter of the inner surface of the outer wall 876 and the diameter of the outer surface of the inner wall 872. In some instances, the smallest distance between the inner surface of the outer wall 876 and the diameter of the outer surface of the inner wall 872 is at least 10% (e.g., at least 25%, at least 50%, or any suitable percentage) of the largest distance between the inner surface of the outer wall 876 and the diameter of the outer surface of the inner wall 872.

A fluid stock provided herein comprises any suitable components. In specific embodiments, the fluid stock comprises a liquid medium and an optional additive. In specific embodiments, the fluid stock comprises a liquid medium and at least one additive. In more specific embodiments, the additive is a polymer and/or a solid particulate inclusion (e.g., nanoscaled—such as less than about 2 micron in at least one dimension—particulate; e.g., nanoparticles being less than about 2 micron in all dimensions, and nanorods and nanofibers being less than about 2 micron in diameter and greater or less than about 2 micron in a second dimension). In specific embodiments, nano-inclusions (e.g., nanoparticles) have nanoscale moprhologies that are about 100 nm or less. In more specific embodiments, at least one dimension (e.g., all dimensions for a nanoparticle) is about 50 nm or less, or about 25 nm or less or about 10 nm or less, or about 5 nm to about 10 nm, or any other suitable size. In other embodiments, processes described herein are optionally utilized with larger particles, such as micro-sized particles having a (e.g., average) dimension of about 2 micron to about 200 micron, about 2 micron to about 100 micron, or the like. In various embodiments, the additives are dissolved and/or otherwise dispersed into the liquid medium. In additional embodiments, further additives are optionally included, as desired. For example, in some instances, an additive optionally includes a fluorinated organosilane (e.g., fluoroalkyl silane (e.g., $F_3C(CF_2)_a(CH_2)_b Si(OR)_3$, wherein a is 0 to 12, e.g., 1-6, b is 0-12, e.g., 1-6, each R is independently a hydrocarbon described herein, such as a C1-6 alkyl), and/or flouropolyether alkoxy silane, such as a perfluoropolyetheralkoxy silane (e.g., $F_3C((CF_2)_a O)_c(CH_2)_b Si(OR)_3$, wherein each a is independently 0 to 12, e.g., 1-2, b is 0-12, e.g., 1-3, c is 0-12, e.g., 1-6, each R is independently a hydrocarbon described herein, such as a C1-6 alkyl or fluoroalkyl), a metal, metal oxide, or ceramic precursor, surfactants, and/or other suitable additives.

Figure 4:
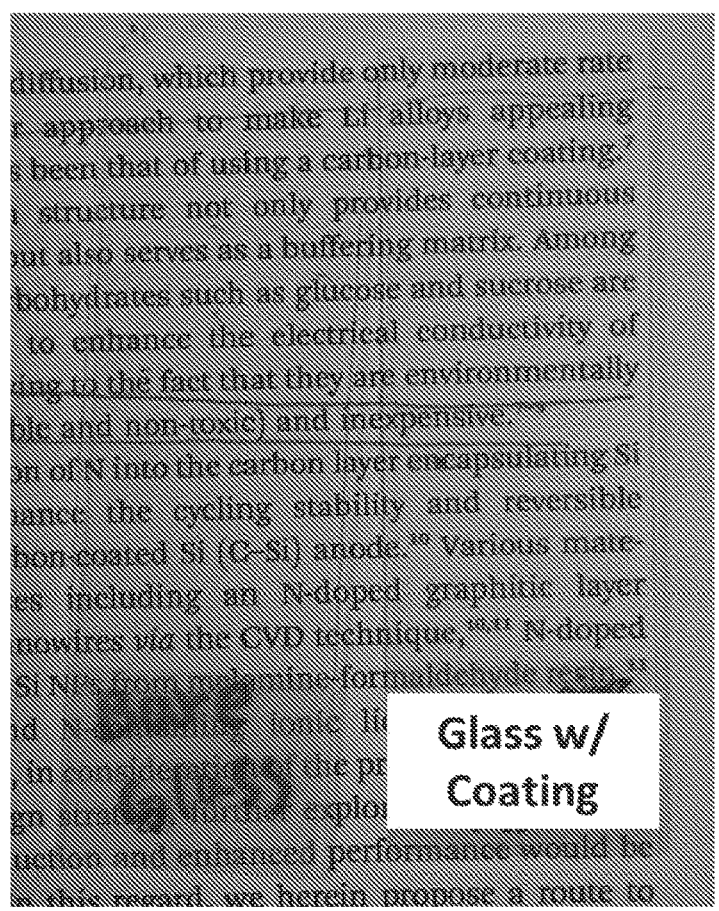
FIG. 4 illustrates a glass substrate without coating and a glass substrate with an exemplary transparent coating provided herein.

Depending on the coating and/or deposition application, any number of polymers are optionally utilized. In some embodiments, polymers include, by way of non-limiting example, polyvinyl alcohol (PVA), polyvinyl acetate (PVAc), polyethylene oxide (PEO), polyvinyl ether, polyvinyl pyrrolidone, polyglycolic acid, hydroxyethylcellulose (HEC), ethylcellulose, cellulose ethers, polyacrylic acid, polyisocyanate, and the like. In some embodiments, the polymer is polystyrene (PS), polymethacrylate (PMA), polyvinylpyridine (PVP), polyvinylalkane, polyvinylcycloalkane (e.g., polyvinylcyclohexane), a polyimide, a polyamide, a polyalkene (e.g., polypropylene (PP)), a polyether (e.g., polyethyelene oxide (PEO), polypropylene oxide (PPO)), a polyamine, or the like. In specific embodiments, the polymer is polycarbonate (PC), poly(methyl methacrylate) (PMMA), polyethylene terephthalate (PET), polystyrene (PS), acrylonitrile butadiene styrene (ABS), polyacrylonitrile (PAN), polyvinyl alcohol (PVA), or polyvinylidene fluoride (PVDF). In certain embodiments, such as wherein a transparent coat is desired, a transparent polymer is utilized (e.g., a polymer that is transparent at a thickness of a deposition or coat applied (e.g., about 1 mm or less). FIG. 4 illustrates a glass substrate without coating and a glass substrate with an exemplary transparent coating provided herein. As can be seen in FIG. 4, use of a transparent polymer results in a transparent coat through which underlying objects are visible. In certain embodiments, a deposition or coat provided herein has a transmittance (300~800 nm) of about 90% of greater, or about 95% or greater. Moreover, use of electrospinning techniques to deposit a similar coat of nanofibers onto the surface resulted in an unacceptably opaque coat, rendering the underlying objects "blurry" or not visible. In some embodiments, the polymer has any suitable molecular weight. For example, in certain embodiments, the polymer has a molecular weight of at least 5,000 atomic mass units ("amu"), at least 10,000 amu, at least 20,000 amu, at least 50,000 amu, and the like. A polymer in used in a process or found in a composition herein has any suitable PDI (weight average molecular weight divided by the number average molecular weight). In some embodiments, the polymer has a polydispersity index of about 1 to about 10, about 2 to about 5, about 1 to about 5, or the like.

In certain embodiments, any suitable amount of polymer is optionally utilized in a fluid stock provided herein. In some instances, the amount of polymer utilized is less than the amount that would inhibit the formation of a plume (dispersion and/or breaking-up of the jet) when being electrosprayed. In some instances, with the use of the gas controlled electrospray processes, greater amounts of polymer are optionally utilized when compared to conventional electrospray techniques because of the effect of the gas to further break-up the jet and/or plume, providing greater formation, dispersion and control of droplets. In certain embodiments, the amount of polymer present in the fluid stock is less than 10 wt. %. In more specific embodiments, the amount of polymer present in the fluid stock is 0 wt. % to about 5 wt. % (e.g., about 0.1 wt. % to about 5 wt. %, or about 0.5 wt. % to about 5 wt. %).

In additional or alternative embodiments, the fluid stock comprises an additive, such as a non-polymer additive, a solid particle additive (e.g., dispersed in the fluid stock), or the like. In some instances, processes for preparing and systems configured to prepare depositions, such as those described herein, do not require the use of a polymer. For example, depositions comprising dispersed particles (e.g., nanostructured particles) are optionally prepared using a fluid stock with or without a polymer. In some instances, when a polymer is included in a fluid stock (e.g., along with a plurality of particles), a deposition comprising a polymer matrix with particles dispersed in and/or on the polymer matrix is formed (e.g., a polymer matrix deposition being formed on a substrate surface). In some other instances, when a fluid stock (comprising a plurality of particles) without a polymer is used, a deposition comprising particles dispersed directly on a substrate is formed.

In some embodiments, the fluid stock and/or deposition comprise an additive, such as a plurality of solid inclusion particulates. In specific embodiments, the additive comprises a plurality of nano-structured particles. In various embodiments, nanostructured particles include, by way of non-limiting example, nanoparticles, nanoscale sheets, nanoribbons, nanorods, nanofibers (including, e.g., high aspect ratio nanorods), and the like. In certain embodiments, the additive comprises metal, ceramic, metal oxide, carbon (e.g., a carbon allotrope), and/or the like. In specific embodiments, the additive comprises metal particles (e.g., nanoparticles), ceramic particles (e.g., nanoparticles), metal oxide particles (e.g., nanoparticles), or a combination thereof. In further or alternative embodiments, the additive comprises a carbonaceous inclusion (e.g., carbon allotrope), such as, by way of non-limiting example, carbon nanotubes (e.g., multi-walled carbon nanotubes (MWCNT), and/or single-walled carbon nanotubes (SWCNT)), graphene (e.g., pristine or defective graphene, such as produced from by reducing, e.g., thermal or irradiation reduction of graphene oxide), graphene oxide, reduced graphene oxide, graphite, amorphous carbon, graphene nanoribbons (GNRs), or the like.

In specific embodiments, an additive provided herein comprises a plurality of nanofibers, the nanofibers comprising a metal, metal oxide, ceramic, carbon (e.g., amorphous carbon) or a combination thereof. Such nanofibers are optionally manufactured by any suitable method, such as those described in WO 2013/033367, published on 7 Mar. 2013, and entitled "Metal and Ceramic Nanofibers," which is incorporated herein by reference for such disclosure. In more specific embodiments, the nanofibers comprise a composite comprising a matrix material and an inclusion material, the inclusion material embedded in the matrix material. In certain embodiment, the matrix material is a metal, metal oxide, ceramic, carbon (e.g., amorphous carbon), polymer (e.g., a polymer described herein), or other suitable material. In some embodiments, the inclusion material is a metal, metal oxide, ceramic, carbon (e.g., amorphous carbon) or other suitable material. Such nanofibers are optionally manufactured by any suitable method, such as those described in WO 2014/043612, published on 20 Mar. 2014, and entitled "Carbonaceous Metal/Ceramic Nanofibers," which is incorporated herein by reference for such disclosure. The nanofibers have any suitable length. In some instances, a given collection of nanofibers comprise nanofibers that have a distribution of fibers of various lengths. In some embodiments, the nanofiber has an average length of about 1 micron or more, or about 5 micron or more, or about 10 micron or more, or about 20 micron or more, or about 50 micron or more, or ever larger sizes, up to and including any size capable of being dispersed in a fluid stock and electrosprayed using a process described herein. In some embodiments, nanofibers described herein have an aspect ratio of about 10 or more. In more specific embodiments, the aspect ratio is about 20 or more, about 50 or more, about 100 or more, about or even larger. "Aspect ratio" is the length of a nanofiber divided by its diameter.

In some embodiments, metal, metal oxide, or ceramic materials (e.g., solid inclusions, precursors, or the like) provided in a metal, metal oxide, or ceramic herein optionally comprise any suitable elemental components, such as a transition metal, alkali metal, alkaline earth metal, post-transition metal, lanthanide, or actinide. Transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Alkali metals include: lithium (Li), sodium (Na), potassium (K), rubidium (Rb), cesium (Cs) and francium (Fr). Alkaline earth metals include: beryllium (Be), magnesium (Mg), calcium (Ca), strontium (Sr), barium (Ba), and radium (Ra). Post-transition metals include: aluminum (Al), gallium (Ga), indium (In), tin (Sn), thallium (Tl), lead (Pb), and bismuth (Bi). Lanthanides include the elements with atomic number 57 to 71 on the periodic table. Actinides include the elements with atomic number 89 to 103 on the periodic table. In addition, silicon (Si), germanium (Ge), antimony (Sb) and polonium (Po) are considered metals for the purposes of the present disclosure. In some embodiments, silicon is used in the process described herein to produce silicon nanofibers. In some embodiments, metal oxides include, by way of non-limiting example, $Al_2O_3$, $ZrO_2$, $Fe_2O_3$, CuO, NiO, ZnO, CdO, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, and $BaSrTiO_3$. Other additives, such as metal precursors, are also optionally utilized. In such cases, upon calcination (e.g., thermal treatment of about 800° C. or more, e.g., about 1200° C. or more, about 1500° C. or more), the metal precursors may be converted to a metal or metal oxide material described herein. Metal precursors include metal iodides, bromides, sulfides, thiocyanates, chlorides, nitrates, azides, fluorides, hydroxides, oxalates, nitrites, isothiocyanates, cyanides, alko-oxides (e.g., methoxide, ethoxide, propoxide, butlyoxide, or the like), or the like. In some examples, the precursor is a metal complex such as metal acetate, metal chloride, metal nitrate, or metal alko-oxide.

In specific embodiments, the additive and/or particles (e.g., nano-structured particles) comprise silicon, a silicon oxide (e.g., SiOx, wherein $0<x\leq 2$), an aluminum oxide, or a titanium oxide (e.g., TiOx, wherein $0<x\leq 2$).

In specific embodiments, the additive comprises carbon nonstructures, such as carbon nanotubes, graphene nanoribbons, carbon nanofibers, mesoporous carbon nanostructures, or any combination thereof. In specific embodiments, an additive provided herein comprises a graphene component (e.g., graphene or a fully reduced graphene oxide), such as an oxidized graphene component (e.g., graphene oxide, reduced graphene oxide (that is still partially oxidized), or the like).

In some embodiments, a film or coating provided herein comprises a carbon (e.g., graphene) matrix or web (e.g., wherein the graphene matrix or web comprises a graphene structure or analog as described herein). In certain embodiments, the carbon matrix or web comprises any suitable amount of a graphene component (e.g., graphene, graphene oxide, or reduced graphene oxide). In specific embodiments, the carbon matrix or web comprises about 25 wt. % or more (e.g., about 50 wt % or more, about 60 wt % or more, about 75 wt % or more, about 85 wt % or more, about 90 wt % or more, or about 95 wt % or more) graphene component. In certain embodiments, the film further comprises a plurality of structures (e.g., micro- or nano-structures, such as comprising metal, metal oxide, and/or ceramic material), such as provided from preformed inclusions provided in a fluid stock herein, or metal or ceramic precursor materials provided in the fluid stock. In certain embodiments, the inclusion materials are embedded within the carbon matrix or web (e.g., graphenic matrix or web), and/or on the surface thereof. In some embodiments, the inclusions comprise nanoscale and/or microscale inclusions (e.g., such nanostructures comprising a nanoscale (e.g., having an average dimension of less than 2 micron, or less than 1 micron)

structure in any one or more dimension, such as nanostructured fibers, particles, sheets, rods, and/or the like). In specific embodiments, the carbon inclusion is a nanostructured carbon having a nanoscale (e.g., less than 2 micron, less than 1 micron, or less than 200 nm) structure in any one or more dimension, such as nanostructured fibers, particles, sheets (e.g., graphenic sheets), rods, and/or the like). In some embodiments, the inclusion comprises microstructures (e.g., having an average dimension of less than 100 micron, less than 50 micron, or less than 30 micron, less than 25 micron, less than 20 micron, less than 15 micron, less than 10 micron, or the like, such as down to about 200 nm, about 500 nm, about 1 micron, or the like). Other details of the suitable materials, inclusions, or structures are as described herein. Further, in some instances, such as wherein larger structures are utilized, larger droplets or particles are necessarily formed upon electrospray according to the processes described herein.

Figure 15:
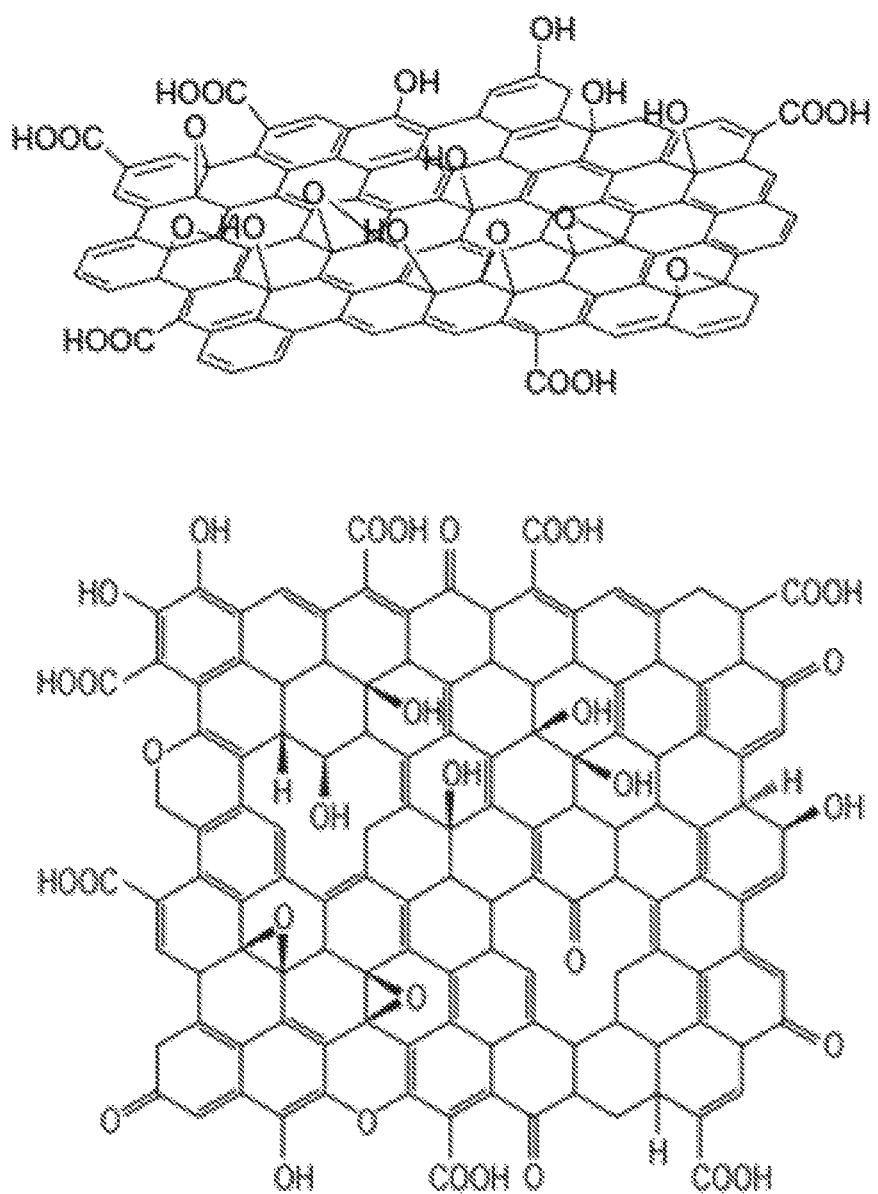
FIG. 15 illustrates exemplary graphene oxide (GO) structures.
Figure 16:
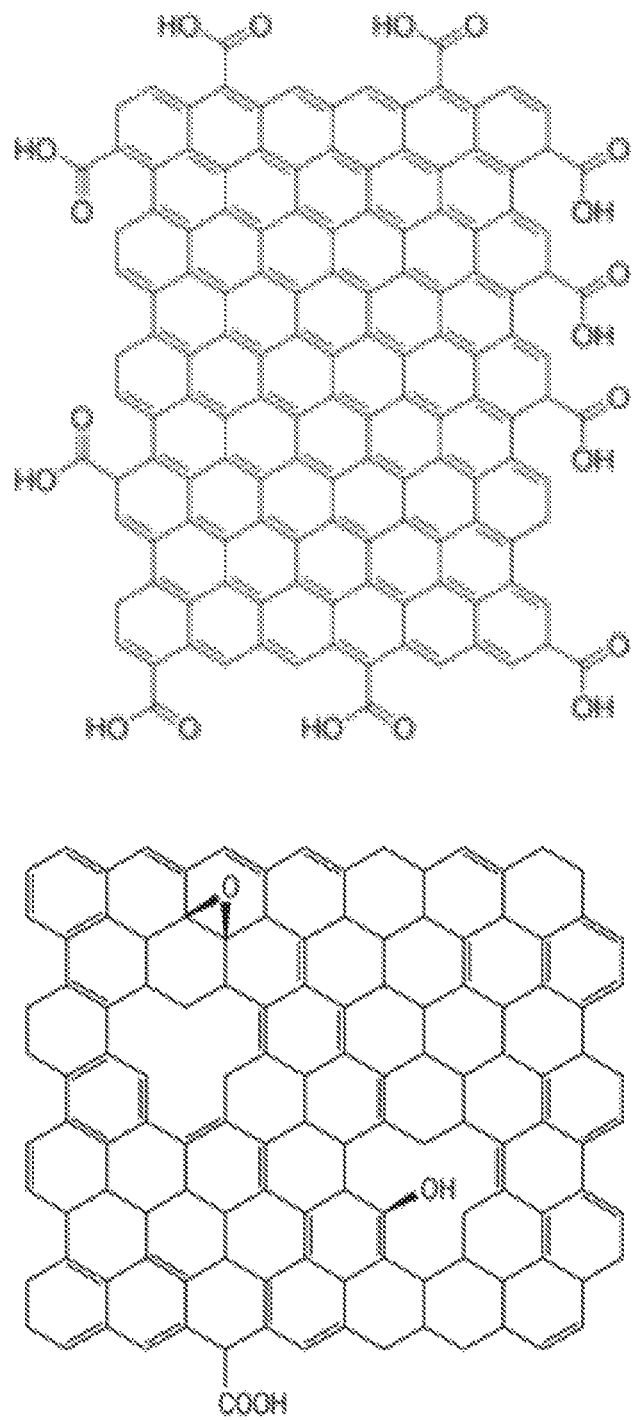
FIG. 16 illustrates exemplary reduced graphene oxide (rGO) structures.

In specific embodiments provided herein is a composition or material comprising a graphene component, such as an oxidized graphene component (e.g., graphene oxide). In certain embodiments, oxidized graphene components are converted to reduced materials via reductive reaction conditions, such as through thermal, irradiation, chemical, and/or other processes described herein. In specific embodiments, thermal conditions using reductive (e.g., hydrogen gas, hydrogen gas mixed with an inert gas, or the like) or inert atmosphere (e.g., nitrogen gas, argon gas, or the like) is utilized. In specific embodiments, the oxidized graphene component is a graphene component functionalized with oxygen, such as with carbonyl groups, carboxyl groups (e.g., carboxylic acid groups, carboxylate groups, COOR groups, such as wherein R is a C1-C6 alkyl, or the like), —OH groups, epoxide groups, ether, and/or the like. In certain embodiments, the oxidized graphene component (or graphene oxide) comprises about 60% or more carbon (e.g., 60% to 99%). In more specific embodiments, the oxidized graphene component comprises about 60 wt. % to about 90 wt. % carbon, or about 60 wt. % to about 80 wt. % carbon. In further or alternative specific embodiments, the oxidized graphene component comprises about 40 wt. % oxygen or less, such as about 10 wt. % oxygen to about 40 wt. % oxygen, about 35 wt. % oxygen or less, about 1 wt. % to 35 wt. % oxygen, or the like. In various instances, oxidized graphene included graphene oxide, such as illustrated by the non-limiting exemplary structures in FIG. 15, and/or reduced graphene oxide, such as illustrated by the non-limiting exemplary structures in FIG. 16.

In certain embodiments, the graphene component (e.g., reduced graphene oxide) comprises about 60% or more carbon (e.g., 60% to 99%), such as about 70 wt. % or greater, about 75 wt. % or more, about 80 wt. % or greater, about 85 wt. % or greater, about 90 wt. % or greater, or about 95 wt. % or greater (e.g., up to about 99 wt. % or more). In certain embodiments, the graphene component (e.g., rGO) comprises about 35 wt. % or less (e.g., 0.1 wt. % to 35 wt. %) oxygen, e.g., about 25 wt. % or less (e.g., 0.1 wt. % to 25 wt. %) oxygen, or about, about 20 wt. % or less, about 15 wt. % or less, about 10 wt. % or less (e.g., down to about 0.01 wt. %, down to about 0.1 wt. %, down to about 1 wt. % or the like) oxygen. In specific embodiments, the graphene component (e.g., rGO) comprises about 0.1 wt. % to about 10 wt. % oxygen, e.g., about 4 wt. % to about 9 wt. %, about 5 wt, % to about 8 wt, %, or the like. In certain embodiments, e.g., wherein an oxidized carbon inclusion material (e.g., graphene component) is reduced, higher ratios of carbon to oxygen are contemplated for the graphene component.

In some embodiments, processes described herein are useful for high throughput processing of graphenic components (e.g., oxidized graphene components) to form highly uniform films and coatings. In certain embodiments, higher concentrations of graphenic inclusion components are able to be processed than are possible using conventional techniques. In certain embodiments, a fluid stock provided herein comprises at least 0.5 wt. %, or at least 1 wt. % graphenic inclusion component, e.g., at least 2 wt. % graphenic inclusion component, at least 2.5 wt. % graphenic inclusion component, at least 3 wt. % inclusion component, at least 5 wt. % graphenic inclusion component, or the like (e.g., up to 15 wt. %, up to 10 wt. %, or the like). In certain embodiments, the fluid stock comprises about 2 wt. % to about 15 wt. % (e.g., about 10 wt. % to about 15 wt. %) graphenic inclusion component.

The additive is present in a fluid stock provided herein in any concentration desired and up to which electrospraying according to a process or using a system described herein is possible. In some instance, electrospraying a fluid stock with a controlled gas steam, such as described in certain instances herein, allows for the electrospraying of fluid stocks comprising very high concentrations of polymer and/or additive. In some instances, the concentration of the additive in the fluid stock is up to about 70 wt. %. In specific embodiments, the concentration of the additive in the fluid stock is about 5 wt. % to about 50 wt. %.

In certain embodiments, the liquid medium comprises any suitable solvent or suspending agent. In some embodiments, the liquid medium is merely utilized as a vehicle and is ultimately removed, e.g., by evaporation during the electrospraying process and/or upon drying of the deposition. In certain embodiments, the liquid medium comprises water, an alcohol (e.g., methanol, ethanol, isopropanol, propanol, butyl alcohol, or the like), dimethylformamide (DMF), tetrahydrofuran (THF), Dimethylacetamide (DMAc), N-methyl-pyrrolidone (NMP), or a combination thereof. In certain embodiments, the liquid medium comprises a liquid precursor material that is converted upon deposition to a desired material, such as a ceramic. In some specific embodiments, the liquid medium comprises polysilazane, a silsesquioxone (e.g., polyhedral oligomeric silsesquioxane (POSS), or polysilsesquioxane (PSSQ)), or a combination thereof—e.g., wherein a deposition comprising ceramic matrix is desired.

In some embodiments, a polysilazane has a structure of general formula (I):

—[SiR$^1$R$^2$—NR$^3$]$_n$— (I)

Figure 5:
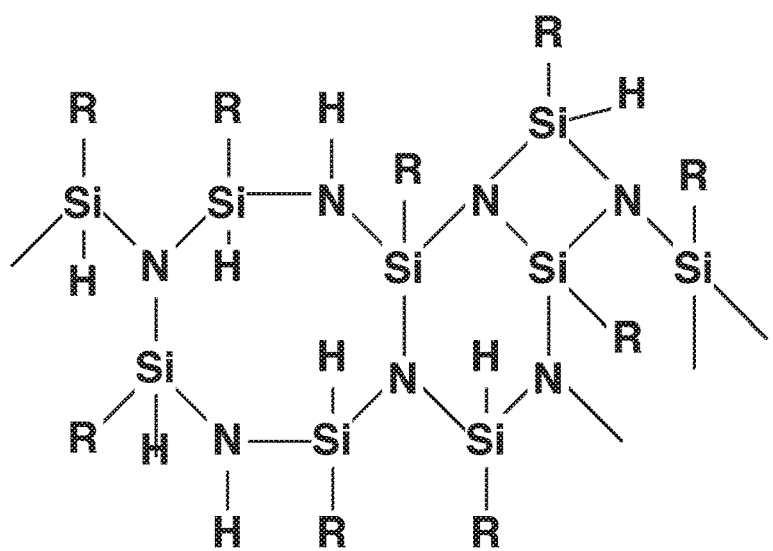
FIG. 5 illustrates an exemplary silazane structure having a plurality of cyclic and chain structures.
Figure 10:
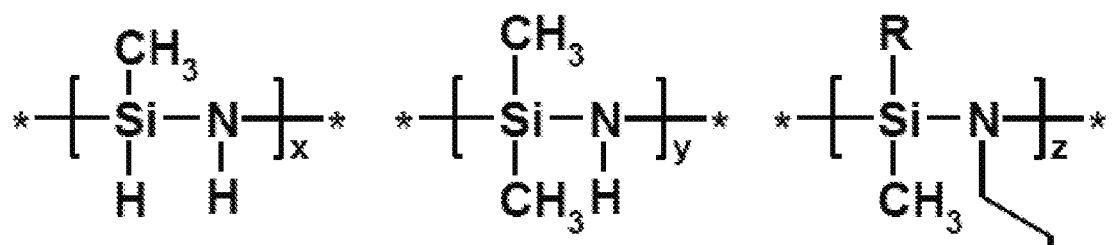
FIG. 10 illustrates exemplary monomeric units of a polysilazanes provided herein.
Figure 11:
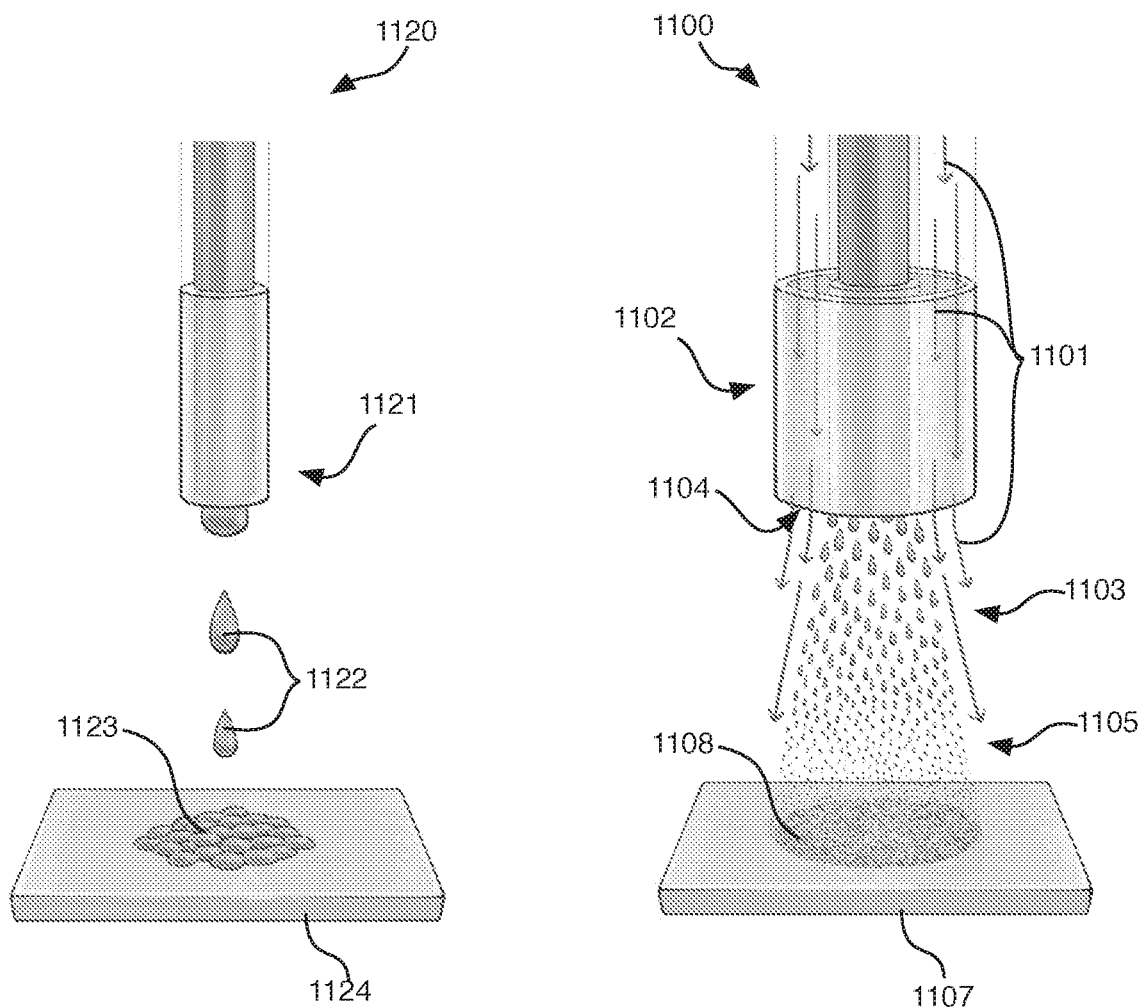
FIG. 11 shows an exemplary illustration of a gas controlled electrospray system provided herein and an exemplary illustration of a non-gas controlled electrospray system.

In some instances, the polysilazane has a chain, cyclic, crosslinked structure, or a mixture thereof. FIG. 5 illustrates an exemplary silazane structure having a plurality of units of Formula I with cyclic and chain structures. In various embodiments, the polysilzane comprises any suitable number of units, such as 2 to 10,000 units and/or n is any suitable value, such as an integer between 2 and 10,000. In certain embodiments, the polysilazane of formula I has an n value such that the 100 to 100,000, and preferably from 300 to 10,000. Additional units are optionally present where each R$^1$ or R$^2$ is optionally cross-linked to another unit at the N group—e.g., forming, together with the R$^3$ of another unit a bond—such cross-links optionally form links between separate linear chains, or form cyclic structures, or a mixture thereof. In an exemplary embodiment, a compound of formula I comprises a plurality of units having a first structure, e.g., —[SiHCH$_3$—NCH$_3$]—, and a plurality of units having a second structure, e.g., —[SiH$_2$NH]—. In specific embodiments, the ratio of the first structure to the second structure is 1:99 to 99:1. Further, in certain embodiments, the compound of Formula I optionally comprises a plurality of units having a third structure, such as wherein the ratio of the first structure to the third structure is 1:99 to 99:1. The various first, second, and optional third structures may be ordered in blocks, in some other ordered sequence, or randomly. In specific embodiments, each R$^1$, R$^2$, and R$^3$ is independently selected from H and substituted or unsubstituted alkyl (straight chain, branched, cyclic or a combination thereof; saturated or unsaturated). Exemplary, polysilazanes provided herein comprise one or more unit of FIG. 10, wherein x, y, and z are individually any suitable integer, such as 1 to about 100 or 1 to about 1,000 or more, and R is as described above for R$^1$ or R$^2$.

In some embodiments, the silsesquioxane compound used in a liquid medium herein comprises a structure of general formula (II):

—[SiR$^1$R$^2$—O]$_n$—          (II)

Figure 6:
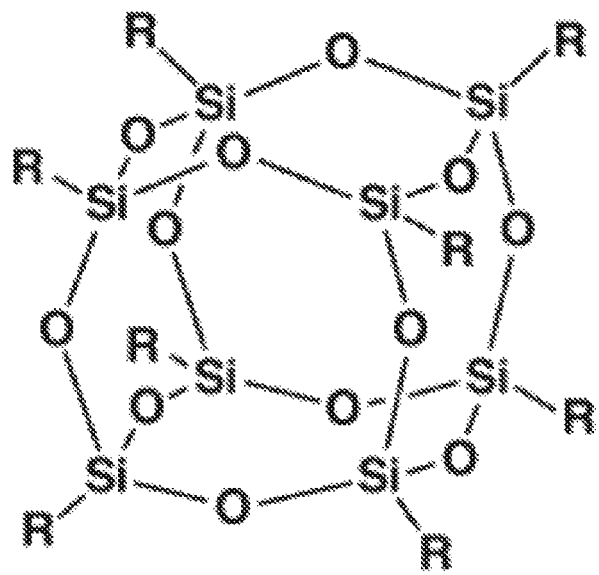
FIG. 6 illustrates an exemplary silsesquioxane cage structure.
Figure 7:
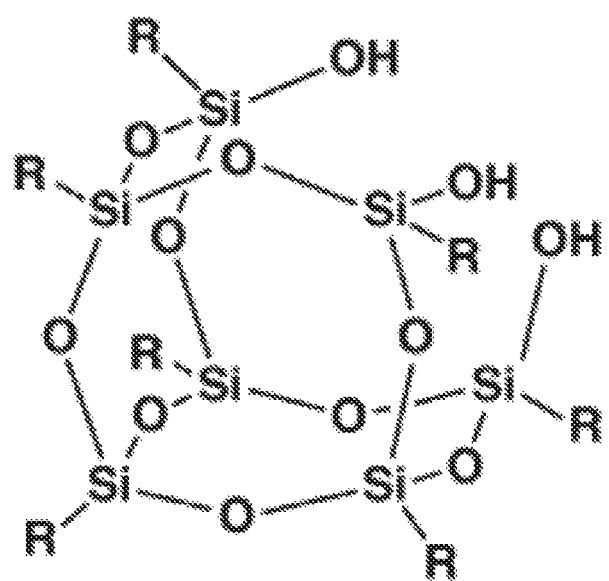
FIG. 7 illustrates an exemplary silsesquioxane opened cage structure.

In some instances, the compound is a silsesquioxane having a cage (e.g., polyhedral oligomeric) or opened cage (e.g., wherein an SiR$^1$ is removed from the cage) structure. FIG. 6 illustrates an exemplary cage wherein n is 8 (wherein the R group of FIG. 6 is defined by R$^1$ herein). FIG. 7 illustrates an exemplary opened cage wherein n is 7 (wherein the R group of FIG. 7 is defined by R$^1$ herein). In some instances, an R$^1$ or R$^2$ group of one unit is taken together with an R$^1$ or R$^2$ group of another unit to form an —O—. In certain embodiments, a cage structure is optionally formed when several an R$^1$ or R$^2$ groups are taken together with the R$^1$ or R$^2$ groups of other units (e.g., as illustrated in FIG. 6). In various embodiments, the polysilazane comprises any suitable number of units, such as 2 to 20 units and/or n is any suitable value, such as an integer between 2 and 20, e.g., 7-16. In certain embodiments, the cage comprises 8 units, but larger cages are optional. In additional, opened cages, wherein one of the units is absent are also optional.

In some embodiments, the fluid stock has any suitable viscosity. In addition, the process and systems described herein allow for the electrospray manufacture of depositions and coatings using highly viscous (and, e.g., highly loaded) fluid stocks, if desired. For example, in some embodiments, fluid stocks utilized in systems and processes herein have a viscosity of about 0.5 centipoise (cP) or more, e.g., about 5 cP or more, or about 1 cP to about 10 Poise. In more specific embodiments, the viscosity is about 10 cP to about 10 Poise. In some instances, gas-driven systems and processes described herein allow for the production of an aerosol or plume that has enough inclusion component to facilitate good, high through-put formation of films that would not be possible using conventional techniques. In certain embodiments, the viscosity of the fluid stock is at least 200 centipoise (cP), such as at least 500 cP, at least 1000 cP, at least 2000 cP, at least 2,500 cP, at least 3,000 cP, at least 4,000 cP, or the like (e.g., up to 20,000 cP, up to about 10,000 cP, or the like). In certain embodiments, the viscosity of the fluid stock is about 2,000 cP to about 10,000 cP.

In some embodiments, a process herein comprises or a system provided herein is configured to provide a voltage to an electrospray nozzle, such as one provided herein. In specific embodiments, the voltage is provided to the inner conduit (e.g., the walls thereof). In certain embodiments, application of the voltage to the nozzle provides an electric field at the nozzle (e.g., at the outlet of the inner conduit thereof). In some instances, the electric field results in the formation of a "cone" (e.g., Taylor cone) (e.g., as illustrated by 106 and 107 of FIG. 1) at the nozzle (e.g., at the outlet of the inner conduit thereof), and ultimately a jet. In certain instances, after the formation of a cone, the jet is broken up into small and highly charged liquid droplets, which are dispersed, e.g., due to Coulomb repulsion.

In some embodiments, any suitable voltage (e.g., direct current voltage) is applied (e.g., to the nozzle). In specific embodiments, the voltage applied about 8 kV to about 30 kV. In more specific embodiments, the voltage applied is about 10 kV to about 25 kV. In certain embodiments, a power supply is configured to provide the voltage to the nozzle.

In certain embodiments, a process herein provides or a system herein is configured to provide a pressurized gas to an outer inlet of an outer conduit of an electrospray nozzle. In some embodiments, the outer conduit is enclosed along the length of the conduit by an outer wall having an interior surface, the outer conduit having an outer conduit inlet and an outer conduit outlet. In some instances, the pressurized gas is provided from a pressurized canister, by a pump, or by any other suitable mechanism. Generally, providing pressurized gas to the inlet of the outer channel results in a high velocity gas being discharged from the outlet of the outer channel of the electrospray nozzle. Any suitable gas pressure or gas velocity is optionally utilized in processes and/or systems herein. In specific embodiments, the gas pressure applied (e.g., to the inlet of the outer channel) is about 15 psi or more. In more specific embodiments, the gas pressure is about 20 psi or more, about 25 psi or more, or about 40 psi or more. In certain embodiments, the velocity of the gas at the nozzle (e.g., the outlet of the outer channel thereof) is about 0.5 m/s or more, about 1 m/s or more, about 5 m/s or more, about 25 m/s or more, or the like. In more specific embodiments, the velocity is about 50 m/s or more. In still more specific embodiments, the velocity is about 100 m/s or more, e.g., about 200 m/s or more, or about 300 m/s. In certain embodiments, the gas is any suitable gas, such as comprising air, oxygen, nitrogen, argon, hydrogen, or a combination thereof.

In certain embodiments, the inner and outer conduits have any suitable diameter. In some embodiments, the diameter of the outer conduit is about 0.2 mm to about 10 mm, e.g., about 1 mm to about 10 mm. In more specific embodiments, the diameter of the outer conduit is about 0.2 mm to about 5 mm, e.g., about 1 mm to about 3 mm. In certain embodiments, the diameter of the inner conduit is about 0.05 mm (e.g., about 0.1 mm) to about 8 mm, e.g., about 0.5 mm to about 5 mm, e.g., about 1 mm to about 4 mm. Generally, as discussed herein, the inner conduit is configured inside the outer conduit, preferably along an identical axis, but slight offset configurations are also considered to be within the scope of the instant disclosure. In some embodiments, an outer wall surrounds the outer conduit, the outer wall having an interior surface (e.g., defining the outer conduit). In some embodiments, the average distance between the exterior surface of the inner wall and the interior surface of the outer wall (referred to herein as the conduit gap) is any suitable distance. In specific instances, the conduit gap is about 0.2 mm or more, e.g., about 0.5 mm or more. In more specific embodiments, the conduit gap is about 0.5 mm to about 5 mm. In certain embodiments, the gap is small enough to facilitate a high velocity gas at the nozzle and to facilitate sufficient disruption of the charged fluid (jet) ejected from the nozzle (e.g., such as to provide sufficiently small droplet sizes and sufficiently uniform inclusion dispersion in the plume and on the collection substrate). In some embodiments, the inner channel and the outer channel run along an identical or similar longitudinal axis, the length of which both the inner and outer channels running along that axis being the conduit overlap length. In some embodiments, the inner conduit length, the outer conduit length, and the conduit overlap length is about 0.1 mm to about 100 mm, or more. In specific embodiments, the inner conduit length, the outer conduit length, and the conduit overlap length is about 0.5 mm to about 100 mm, e.g., about 1 mm to about 100 mm, about 1 mm to about 50 mm, about 1 mm to about 20 mm, or the like. In certain embodiments, the ratio of the conduit overlap length to the first diameter being about 0.5 to about 10, e.g., about 1 to about 10. In some embodiments, the inner conduit is longer than the outer conduit, the inner conduit protruding beyond the outer conduit, e.g., as illustrated in FIGS. 1 (108 and 109) and FIG. 8. In some embodiments, the protrusion length is about −0.5 mm to about 1.5 mm, e.g., about 0 mm to about 1.5 mm.

Figure 3:
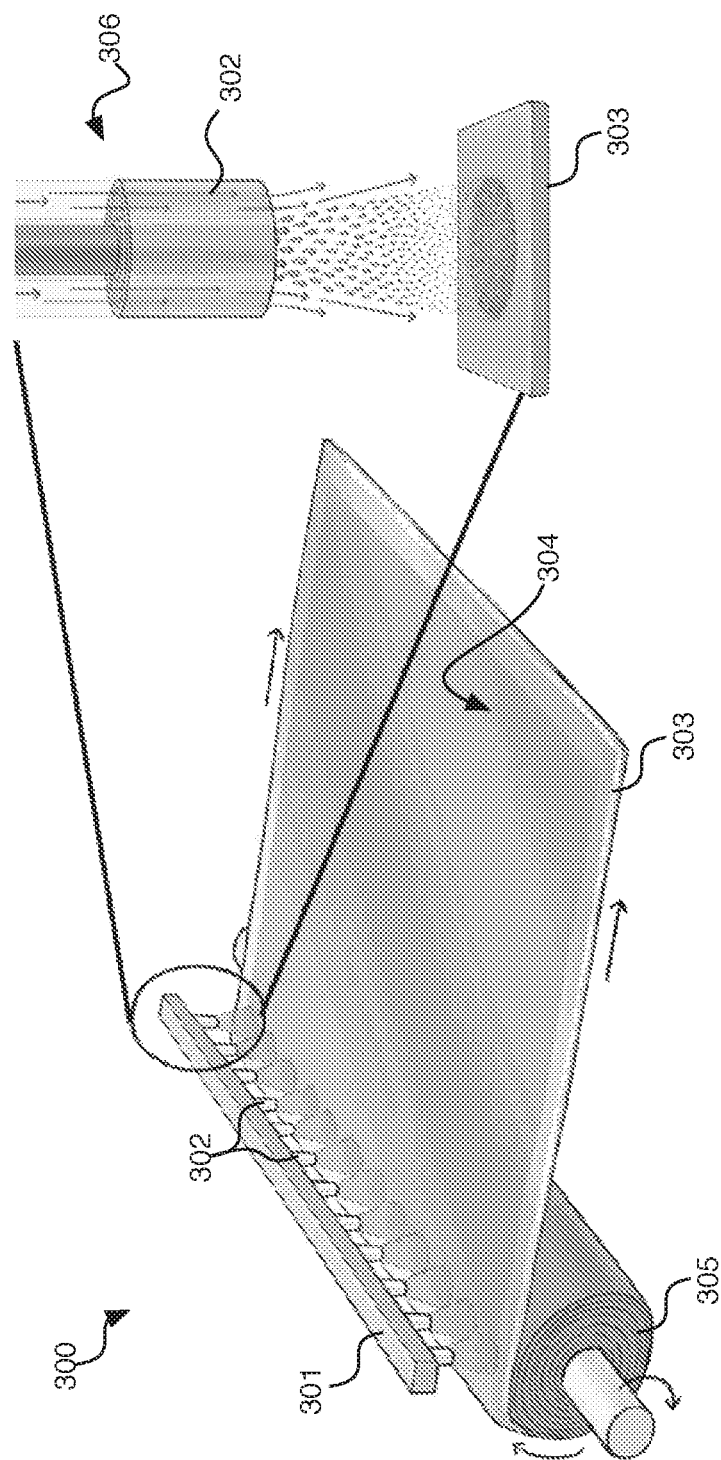
FIG. 3 illustrates an exemplary system provided herein comprising a bank of electrospray nozzles positioned opposite a substrate.

In certain embodiments, processes herein comprise collecting and/or systems herein are configured to collect nanoscale particles and/or droplets of the plume onto a substrate. In specific embodiments, collection of these small particles/droplets allows for the formation of a uniform deposition on the substrate. Further, given the small size of the particles and/or droplets formed by systems and processes described herein, it is possible to form depositions having thin and/or uniform layers, and to have good control of the thickness thereof. In some embodiments, the substrate is positioned opposite the outlet of the nozzle. FIG. 3 illustrates an exemplary system 300 provided herein comprising a bank 301 of electrospray nozzles 302 positioned opposite a substrate 303. FIG. 3 also illustrates an exploded view 306 of a nozzle 302 and a substrate 303. As is exemplarily illustrated in FIG. 3, electrospraying a fluid stock onto a substrate forms a deposition 304 (e.g., nanoscale coating) thereon. In some embodiments, the substrate and/or the electrospray bank is configured to be mobile, allowing facile deposition onto a substrate. As illustrated in FIG. 3, the substrate 303 is optionally configured to be affixed to a roll 305, and/or the bank is configured to move along the surface of a substrate, depositing a coating on the substrate as the bank moves. In specific embodiments, the substrate is itself grounded or positioned between a grounded component (the "collector") and the nozzle. Alternatively, a voltage, such as described herein, is applied to the "collector" and the nozzle is grounded.

In some embodiments, depositions provided herein are thin layer depositions, which are suitable for any number of applications. In various embodiments, the depositions are coatings comprising a matrix material (e.g., polymer or ceramic) and optionally further comprising inclusions (e.g., nanostructured inclusions). In some embodiments, the inclusions are dispersed in and/or on the matrix. In other embodiments, depositions provided herein are coatings comprising a plurality of structures, such as nanostructures (e.g., the nanostructures forming the coating and being dispersed on a substrate). Also provided in some embodiments herein are articles of manufacture comprising a deposition or coat, e.g., a thin-layered coat manufactured or capable of being manufactured according to the processes described herein. In certain embodiments, provided herein is a substrate comprising a coating or deposition described herein on the surface thereof.

As discussed herein, processes and systems described herein allow for good control of the thickness of depositions provided for and described herein. In some embodiments, a deposition provided herein is a thin layer deposition, e.g., having an average thickness of 1 mm or less, e.g., about 1 micron to about 1 mm. In specific embodiments, the deposition has a thickness of about 500 micron or less, e.g., about 1 micron to about 500 micron, about 1 micron to about 250 micron, or about 10 micron to about 200 micron. Further, the processes and systems described herein not only allow for the manufacture of thin layer depositions, but of highly uniform thin layer depositions. In some embodiments, the depositions provided herein have an average thickness, wherein the thickness variation is less than 50% of the average thickness, e.g., less than 30% of the average thickness, or less than 20% of the average thickness. In addition, in some embodiments wherein nano-inclusions (additives) are included in the fluid stock and/or deposition (e.g., wherein the deposition comprises a matrix material, such as a polymer matrix material), the dispersion of the nano-inclusions (additives) is such that the most probable distance between the nano-inclusions is from about 100 nm to about 1000 nm.

Further, in some embodiments, it is desirable that any additives in the fluid stock are dissolved and/or well dispersed prior to electrospray, e.g., in order to minimize clogging of the electrospray nozzle, ensure good uniformity of dispersion of any inclusions in the resulting deposition, and/or the like. In specific embodiments, the fluid stock is agitated prior to being provided to the nozzle (e.g., inner conduit inlet thereof), or the system is configured to agitate a fluid stock prior to being provided to the nozzle (e.g., by providing a mechanical stirrer or sonication system associated with a fluid stock reservoir, e.g., which is fluidly connected to the inlet of the inner conduit of an electrospray nozzle provided herein).

In a specific and exemplary embodiment, processes and systems provided herein are useful for manufacturing a deposition on a substrate that is transparent and/or imposes hydrophobic and/or oleophobic (anti-fingerprinting) characteristics to the surface. In addition, in some instances, the surface is anti-reflective. In specific embodiments, a process and/or system provided herein is utilized to manufacture such a surface. In some embodiments, the fluid stock suitable therefore comprises, for example, a polysilazane and/or a silsesquioxane (e.g., polyhedral oligomeric silsesquioxane (POSS) and/or polysilsesquioxane (PSSQ)). In further or alternative embodiments, the fluid stock comprises a transparent polymer (e.g., a polymer that is transparent in the form of a coating, such as a film (e.g., a coherent film), at a thickness less than the thickness of the deposition coating, such about 1 mm or less). A non-limiting example of such a polymer is polycarbonate (poly(bisphenol a carbonate)), or any other suitable polymer described herein. In preferred embodiments, the polymer is not soluble or swellable in water. In certain embodiments, the fluid stock further or alternatively comprises nanostructured inclusions, such as silica nanoparticles, or any other suitable inclusion described herein. In some embodiments, the fluid stock further or alternatively comprises fluoroalkyl silane or perfluoropolyether alkoxy silane (e.g., wherein alkyl or alk is a saturated or unsaturated straight chain or branched hydrocarbon having 1-20 carbon atoms, e.g., 1-6 carbon atoms, such as methyl, ethyl, propyl, isopropyl, butyl, t-butyl, sec-butyl, pentyl, hexyl, or the like). In specific embodiments, the fluid stock comprises polycarbonate, silica nanoparticles, organic polysilazane, and fluroalkyl silane the ratio of polycarbonate to silica nanoparticles to organic polysilazane to fluoroalkyl silane being about 1 to about 70 (e.g., about 1 to about 50, or about 10 to about 30) weight parts polymer (e.g., polycarbonate) to about 1 to about 95 (e.g., about 5 to about 70, or about 10 to about 50, or about 20 to about 40) weight parts inclusions (e.g., silica nanoparticles) to about 1 to about 99 (e.g., about 10 to about 90, about 25 to about 75, about 40 to about 60, or about 50) weight parts ceramic precursor (e.g., organic polysilazane). In additional embodiments, the fluid stock further comprises a fluorinated organosilane, e.g., with about 0.05 to about 5 (e.g., about 0.1 to about 2.5, or about 0.5 to about 1.5) weight parts thereof (e.g., fluoroalkyl silane).

Figure 9:
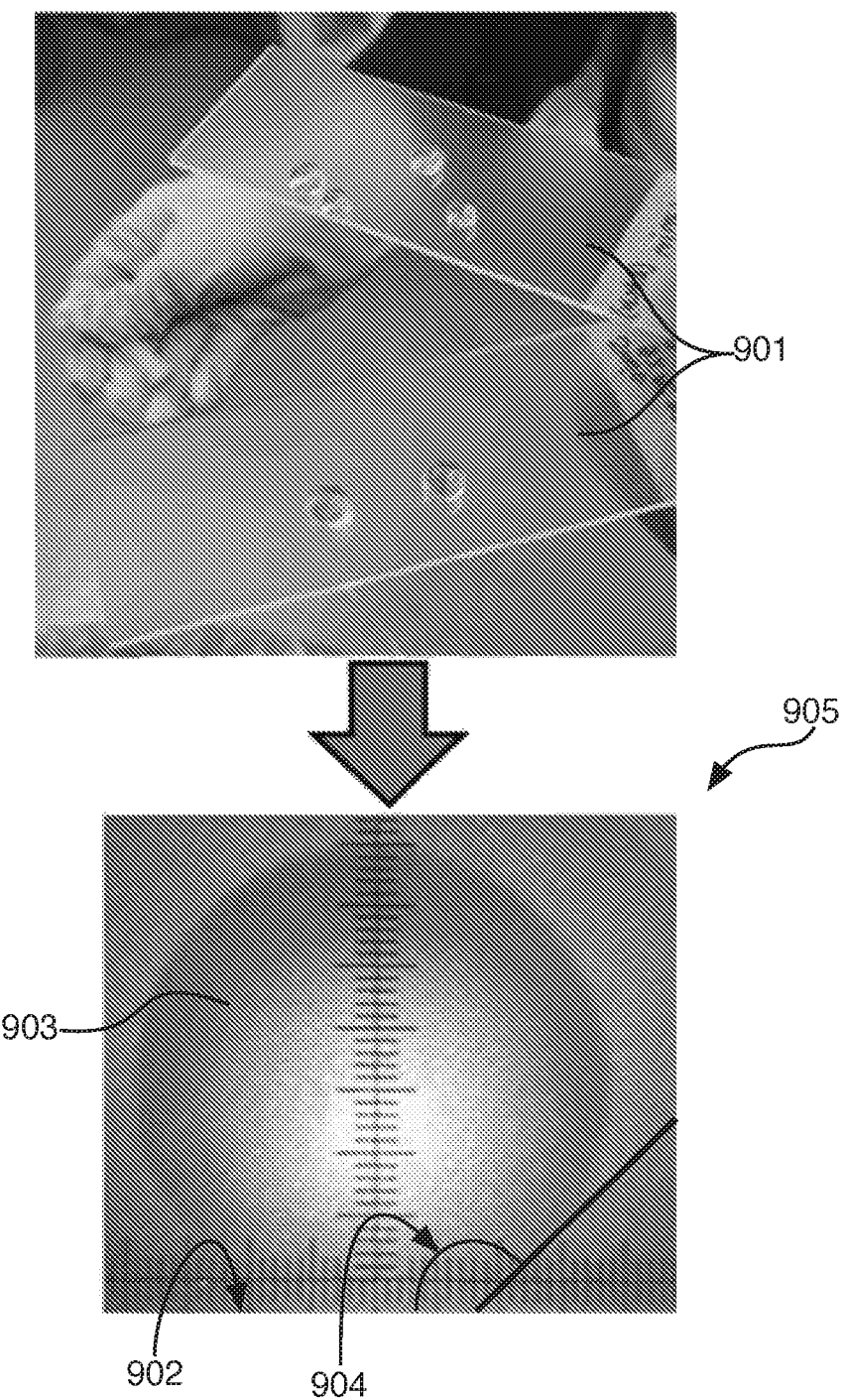
FIG. 9 illustrates exemplary super hydrophobic surfaces prepared according to the processes and with the systems described herein.

In certain embodiments, superhydrophobic surfaces provided herein have a contact angle (e.g., of water) of about 130 degrees or more, e.g., about 135 degrees or more. In certain embodiments the superhydrophobic surface has a water contact angle of at least 130 degrees. FIG. 9 illustrates non-limiting, and exemplary super hydrophobic surfaces 901 prepared according to the processes and with the systems described herein. As is demonstrated in the exploded view 905 of a droplet 903 on a surface 902 of a non-limiting exemplary surface prepared in accordance with the processes and using the systems described herein is shown to be superhydrophobic, wherein a bead of water 903 on the surface 902 has a contact angle 904 of about 136 degrees.

In some embodiments, articles of manufacture are provided herein comprising, e.g., a coat described herein. In certain embodiments, an article of manufacture provided herein comprises a deposition (e.g., thin layer deposition) described herein. In specific embodiments, provided herein is an article of manufacture comprising a substrate with a surface, the surface being at least partially coated with a material that imparts to the surface superhydrophobic characteristics, such as described herein. In specific embodiments, an article of manufacture provided herein comprises a coating or deposition comprising a polymer matrix and a plurality of nano-inclusions embedded therein (and/or on the surface thereof). In yet more specific embodiments, the polymer matrix comprises polycarbonate and the nano-inclusions comprise silica nanoparticles. In some embodiments, the article of manufacture comprising a surface is any suitable article, such as, by way of non-limiting example, a window pane, such as in a building or automobile, eye glasses, laptop computers, computer monitors, televisions, tablets, mobile telephones (e.g., Smartphones), personal digital assistants (PDAs), watch, and other articles.

In certain embodiments, the substrate is any suitable substrate (e.g., a grounded substrate, or a substrate located between the electrospray nozzle and a grounded plate). In some embodiments, collected films are optionally removed from the substrate to provide self-supporting film (e.g., that is optionally deposited on a secondary surface).

In some instances, material or films/depositions provided herein are high density (e.g., about 0.1 g/cm$^3$ or more, about 0.5 g/cm$^3$ or more (such as about 1 g/cm$^3$, about 1.5 g/cm$^3$ or more, greater than 1.5 g/cm$^3$, about 0.7 g/cm$^3$ to about 2 g/cm$^3$, or the like), flexible, and/or thin layer films or depositions.

In some embodiments, relatively small amounts of inclusion are required to form a coating or film provided herein, such as wherein the coating or film has good performance uniformity over the surface of the coating or film. In some instances, processes provided herein are well designed to not only manufacture high performance materials, but to also manufacture thin materials having very good uniformity and very low defect characteristics (e.g., which defects may result in reduced performance over time).

In various embodiments herein, inclusions and materials are described as having specific characteristics. It is to be understood that such disclosures include disclosures of a plurality of such inclusions having an average equal to the specific characteristics identified, and vice-versa.

EXAMPLES

Example 1

A fluid stock comprising 3 wt. % polyvinylalcohol (PVA) in water is prepared. The solution is provided to a non-gas-controlled electrospray nozzle, to which a direct voltage of about 10 kV to about 15 kV is maintained. A grounded collector is positioned opposite the electrospray nozzle, at a distance of about 20 cm to about 25 cm. High speed imaging of the electrospray process is illustrated in FIG. 1 (left panel), and a PVA deposition is collected on the collector, as illustrated in FIG. 2 (left panels). As is illustrated in FIG. 2, the deposition is irregular, with large PVA beads being evident.

A 3 wt. % PVA solution is also electrosprayed by injecting the solution into a gas (air) stream ($Q_{air}$ of about 11 SCFH) using a coaxially configured nozzle as described herein. A direct voltage of about 10 kV to about 15 kV is maintained at the nozzle. A grounded collector is positioned opposite the electrospray nozzle, at a distance of about 20 cm to about 25 cm. High speed imaging of the electrospray process is illustrated in FIG. 1 (right panel), and a PVA deposition is collected on the collector, as illustrated in FIG. 2 (right panels). As is illustrated in FIG. 2, the deposition is highly uniform, with no large PVA beads being evident.

Example 2

A fluid stock comprising polycarbonate, silica nanoparticles, organic polysilazane, and fluoroalkyl silane in a ratio of about 20/30/49/1 is prepared in DMF (additive:liquid medium=5:95). The fluid stock is electrosprayed on a glass substrate using a non-gas controlled process and a gas-controlled process similar to Example 1. FIG. 9 illustrates the surface coated using a gas-controlled process. Surfaces prepared according to both processes are tested for hydrophobicity, the gas-controlled process yielding a surface having a contact angle (of water) of about 136 degrees (as illustrated by FIG. 9), whereas the base glass has a contact angle of about 104 degrees and the non-gas-controlled process yields a surface having a contact angle (of water) of about 120 degrees. A surface is also manufactured using an air-only spray process, such process yielding a surface having a contact angle of about 126 degrees. Further, as illustrated in FIG. 4, the coated glass substrate retains good transparency. By contrast, a solution with increased polymer concentration produces a coating comprising nanofibers (rather than a coherent film), which has poor transparency (being blurry to opaque).

Example 3

Figure 12:
FIG. 12 illustrates SEM images of a deposition formed (panel A) after 30 seconds of gas controlled electrospraying of a graphene oxide stock, and (panel B) after 30 seconds of electrospraying of the graphene stock without air.
Figure 12:
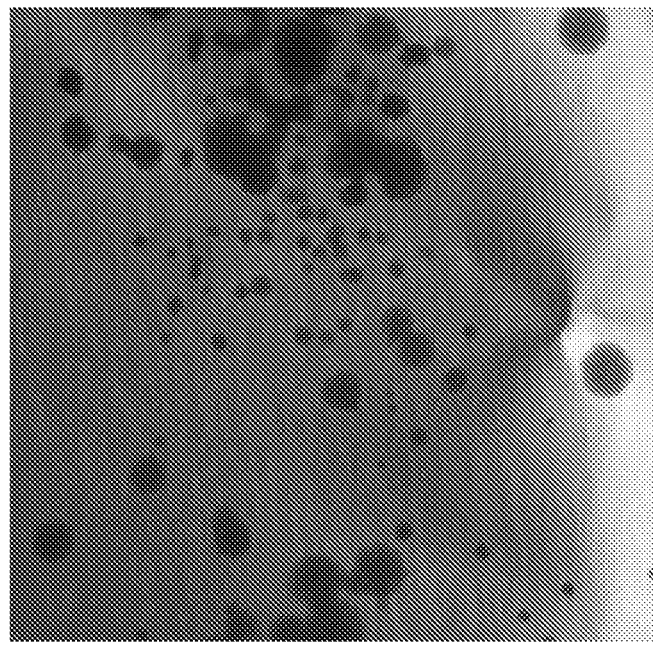
Figure 13:
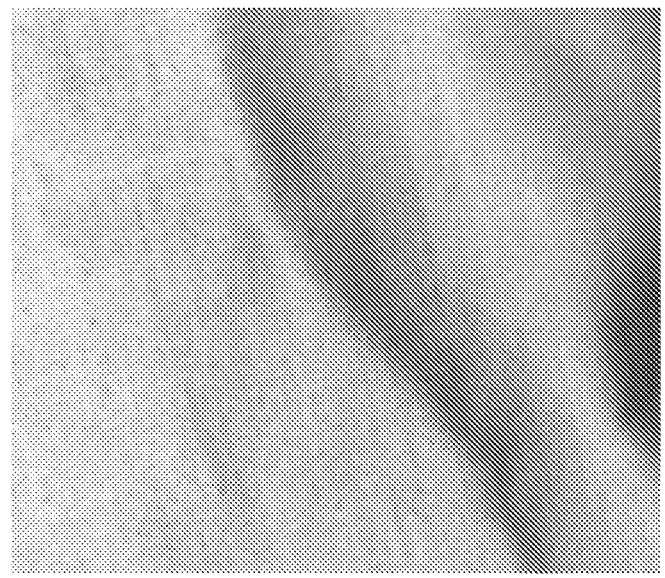
FIG. 13 illustrates SEM images of a deposition formed (panel A) after 1 minute of gas controlled electrospraying of a graphene oxide stock, and (panel B) after 1 minute of electrospraying of the graphene stock without air.
Figure 13:
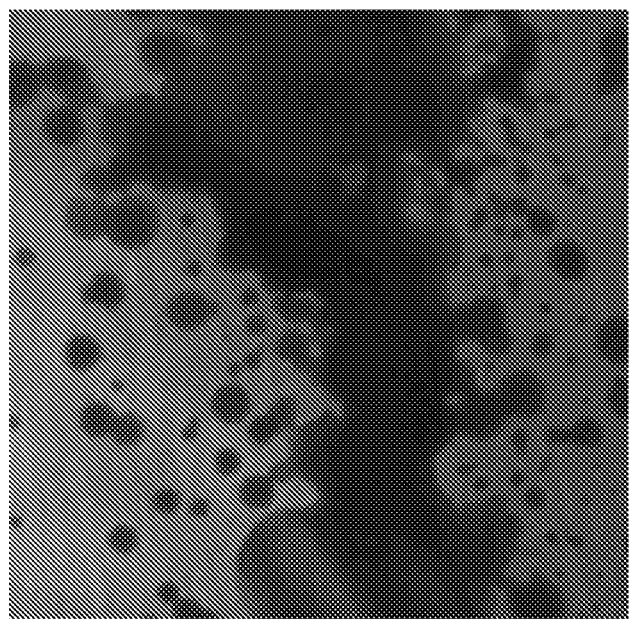
Figure 14:
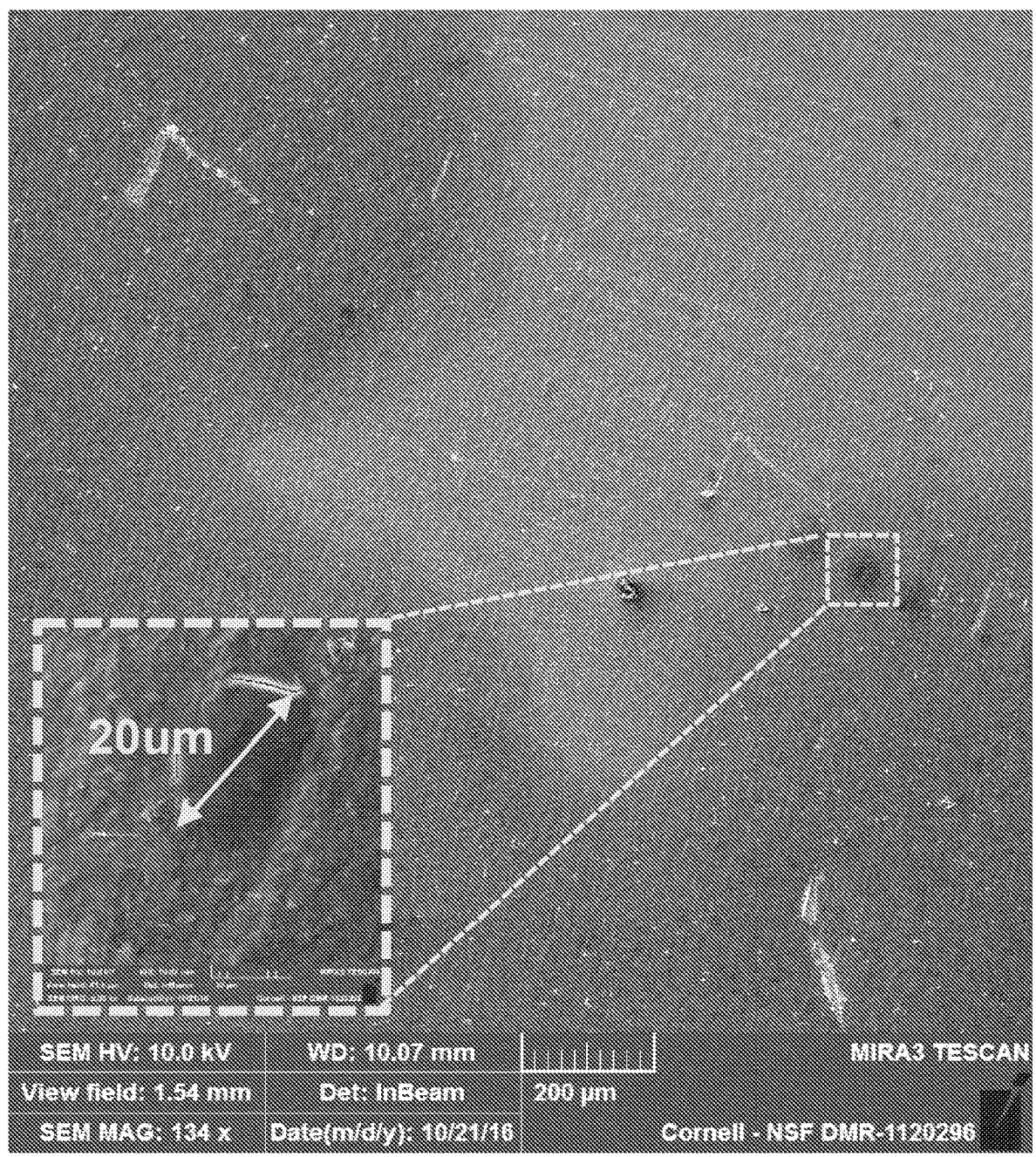
FIG. 14 illustrates SEM images of GO depositions formed without air after just one minute, including the non-uniform structure and large defects produced thereby.
Figure 17:
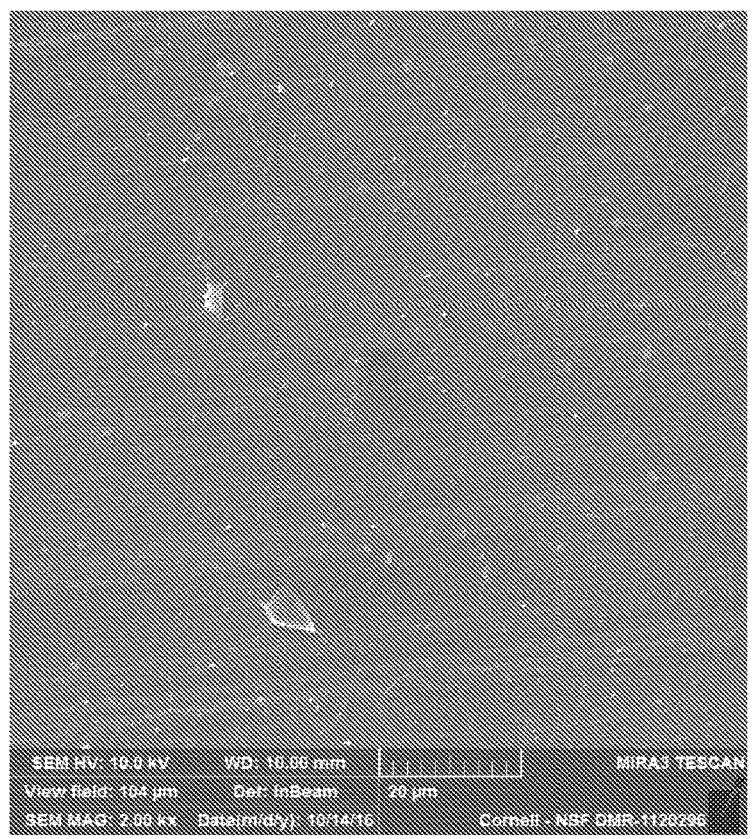
FIG. 17 illustrates SEM images of exemplary GO films (at various zoom levels—a scale bar of 20 micron for the upper panel and 10 micron for the lower panel) prepared using exemplary gas-controlled processes described herein.
Figure 17:
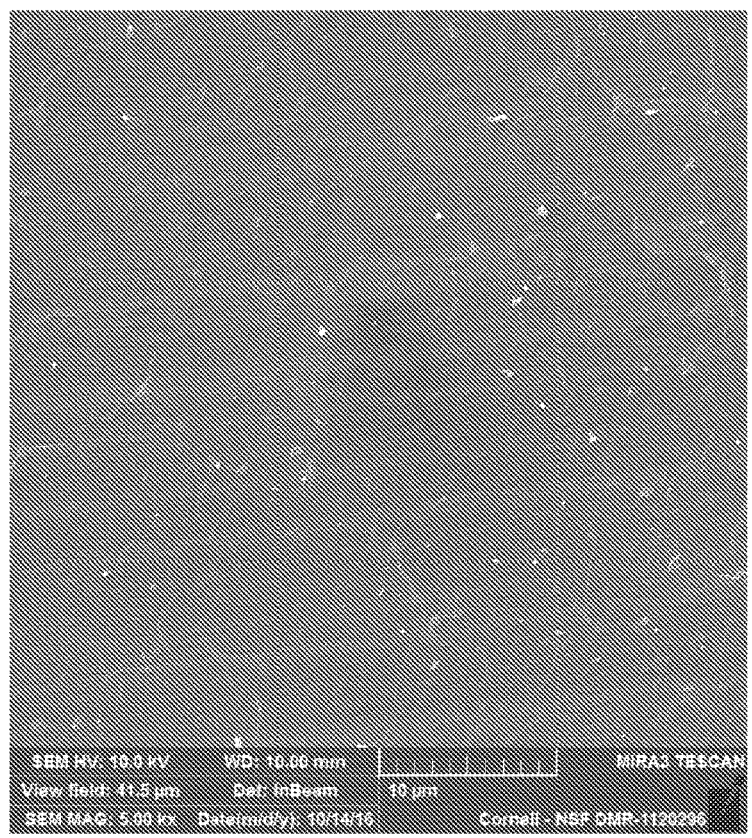

A viscous fluid stock comprising graphene oxide (0.75 wt. %) in an aqueous medium (additive:liquid medium=0.75:99.25). The fluid stock is electrosprayed on a metal (substrate using a non-gas controlled process and a gas-controlled process similar to Example 1. For comparison, a system using graphene oxide (0.75 wt %) in an aqueous medium is electrosprayed with and without a high velocity gas stream. Similar conditions are utilized, with a working voltage of 25 kV, a distance from the nozzle to the collector of 20 cm, and a flow rate of 0.07 mL/min. As illustrated in the SEM images of FIG. 12 (panel A) after 30 seconds of gas controlled electrospraying of the stock, the beginning of the formation of a fine film of graphene oxide is observed. By contrast as illustrated in FIG. 12 (panel B) after only 30 seconds of electrospraying of the stock without air, large droplets and collections of graphene oxide are observed on the substrate. As illustrated in FIG. 13 (panel B), after just 1 minute, the droplets coalesce and begin to run when no air is utilized, while, as illustrated in FIG. 13 (panel A), good film formation is continued to be observed when spraying the stock with a high velocity gas. FIG. 14 illustrates that in the areas where graphene oxide is being deposited (without air), large defects are observed even after only 1 minute. As can be seen, large defects of up to 20 micron or more are already being formed. In addition, after 2 minutes of spraying without air, defects of larger than 100 micron are already formed. By contrast, well ordered films are observed when spraying graphene oxide fluid stocks, even when spraying long enough to form thick films. FIG. 17 illustrates SEM images of very uniform and well dispersed GO films are prepared using gas-controlled processes described herein. As can be seen in the FIG. 17, even at much greater zoom, highly uniform GO films with very few and very small or no defects are observed.

What is claimed is:

1. A process for producing a graphenic film, the process comprising producing an aerosol or plume from a fluid stock,
   the fluid stock comprising a fluid and a plurality of solid inclusions comprising a graphenic component, the graphenic component comprising graphene, graphene oxide, or reduced graphene oxide,
   the aerosol or plume being produced by (i) providing the fluid stock to a first inlet of a first conduit of an electrospray nozzle, the first conduit being enclosed along the length of the first conduit by a wall having an interior surface and an exterior surface, the first conduit having a first outlet, and (ii) providing a voltage to the nozzle, wherein the voltage applied to the nozzle is between about 8 kV and 60 kV, and the aerosol or plume being produced in the presence of a high velocity gas, the high velocity gas having a velocity of more than 1 m/s, and
   the film having a thickness of about 1 micron to about 50 mm.

2. The process of claim 1, wherein the film has a thickness variation of less than 50% of the average thickness.

3. The process of claim 1, wherein the fluid stock further comprises a plurality of nanoparticles.

4. The process of claim 1, wherein the graphenic component comprises graphene, graphene oxide, reduced graphene oxide, or any combination thereof.

5. The process of claim 1, wherein the fluid comprises water, an alcohol, dimethylformamide (DMF), tetrahydrofuran (THF), Dimethylacetamide (DMAc), chloroform, dichloromethane, or N-methyl-pyrrolidone (NMP).

6. The process of claim 1, wherein the graphenic component is present in the fluid stock in a concentration of at least 0.5 wt. %.

7. The process of claim 1, wherein the fluid stock is provided to the first inlet at a rate of at least 0.1 mL/min.

8. The process of claim 1, wherein the viscosity of the fluid stock is at least 20 cP.

9. The process of claim 1, wherein the viscosity of the fluid stock is at least 200 cP.

10. The process of claim 1, wherein the graphenic film is collected on a roll-to-roll assembly platform.

11. A system for manufacturing a film, the system comprising:
    a. a nozzle comprising:
        i. a first conduit, the first conduit being enclosed along the length of the conduit by a wall having an interior surface and an exterior surface, the first conduit having a first inlet end and a first outlet end, and the first conduit having a first diameter; and
        ii. a second conduit, the second conduit being enclosed along the length of the conduit by a second wall having an interior surface, the second conduit having a second inlet end and a second outlet end, and the second conduit having a second diameter;
    b. a power supply configured to apply a voltage to the wall of the first conduit, wherein the voltage applied to the first conduit is between about 8 kV and 60 kV;
    c. a collector configured to receive a (non-fibrous) deposition thereon, the collector being grounded, or being configured between a ground and the nozzle;
    d. a pressurized gas supply configured to provide a high velocity gas to the second conduit, the high velocity gas having a velocity of more than 1 m/s.

12. The process of claim 1, wherein the high velocity gas is configured to break apart of a plurality droplets formed by the nozzle.

13. The process of claim 1, wherein the aerosol or plume comprises a plurality of droplets collected on a substrate and wherein the plurality of droplets comprise less than 20 inclusions per droplet on average.

14. The process of claim 1, wherein the aerosol or plume comprises a plurality of droplets collected on a substrate and wherein the plurality of droplets comprise less than 5 inclusions per droplet on average.

15. The process of claim 1, wherein the fluid stock comprises at least two types of inclusions and the film comprises multiple inclusion types substantially uniformly dispersed in the film.

16. The process of claim 1, wherein the voltage applied to the nozzle is between about 10 kV and 60 kV.

17. The process of claim 1, wherein the high velocity gas has a velocity of at least 5 m/s.

18. The process of claim 1, wherein the film is substantially uniform in thickness and dispersion, and wherein the film has an average thickness of about 5 micron to 50 mm.

19. The process of claim 1, wherein the fluid stock comprises micro-scale particles having an average dimension or diameter of at least about 2 micron.

20. The process of claim 1, wherein the plume comprises micro-scale particles or droplets having an average dimension or diameter of at least about 2 micron.

21. The process of claim 1, further comprising collecting the aerosol or plume to form the film at a distance from the nozzle of at least about 10 cm.

22. The process of claim 1, wherein the plurality of solid inclusions comprise different types of inclusions.

* * * * *